(12) United States Patent
Mayes et al.

(10) Patent No.: US 7,026,071 B2
(45) Date of Patent: Apr. 11, 2006

(54) NON-CROSSLINKED, AMORPHOUS, BLOCK COPOLYMER ELECTROLYTE FOR BATTERIES

(75) Inventors: Anne M. Mayes, Waltham, MA (US); Gerbrand Ceder, Wellesley, MA (US); Yet-Ming Chiang, Framingham, MA (US); Donald R. Sadoway, Waltham, MA (US); Mehmet K. Aydinol, Isci Bloklari Mah.Ankara (TR); Philip P. Soo, Cambridge, MA (US); Young-Il Jang, Knoxville, TN (US); Biying Huang, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 488 days.

(21) Appl. No.: 09/862,916

(22) Filed: May 22, 2001

(65) Prior Publication Data

US 2002/0048706 A1 Apr. 25, 2002

Related U.S. Application Data

(62) Division of application No. 09/284,447, filed as application No. PCT/US97/18839 on Oct. 10, 1997.

(60) Provisional application No. 60/028,342, filed on Oct. 11, 1996, provisional application No. 60/028,341, filed on Oct. 11, 1996, provisional application No. 60/028,278, filed on Oct. 11, 1996, and provisional application No. 60/053,876, filed on Jul. 28, 1997.

(51) Int. Cl.
*H01M 6/00* (2006.01)
*B32B 27/30* (2006.01)

(52) U.S. Cl. ................ 429/305; 429/188; 429/309; 429/322; 428/409; 428/522

(58) Field of Classification Search ............. 429/305, 429/309, 188, 322, 231.1; 428/409, 522
See application file for complete search history.

(56) References Cited

U.S. PATENT DOCUMENTS

| | | |
|---|---|---|
| 3,939,008 A | 2/1976 | Longo et al. |
| 4,260,668 A | 4/1981 | Lecerf et al. |
| 4,292,382 A | 9/1981 | Lecerf et al. |
| 4,465,747 A | 8/1984 | Evans |
| 4,478,921 A | 10/1984 | Langan |
| 4,542,083 A | 9/1985 | Cava et al. |
| 4,654,280 A | 3/1987 | Bailey |
| 4,668,595 A | 5/1987 | Yoshino et al. |
| 4,758,483 A | 7/1988 | Armand et al. |
| 5,051,211 A | 9/1991 | Ward et al. |
| 5,196,484 A | 3/1993 | Giles et al. |
| 5,219,564 A | 6/1993 | Zalipsky |
| 5,268,243 A | 12/1993 | Noda et al. |
| 5,286,582 A | 2/1994 | Tahara et al. |
| 5,300,374 A | 4/1994 | Agrawal et al. |
| 5,316,877 A | 5/1994 | Thackeray et al. |
| 5,350,646 A | 9/1994 | Armand et al. |
| 5,370,949 A | 12/1994 | Davidson et al. |
| 5,393,622 A | 2/1995 | Nitta et al. |
| 5,407,762 A | 4/1995 | Mitate et al. |
| 5,429,890 A | 7/1995 | Pynenburg et al. |
| 5,455,027 A | 10/1995 | Zalipsky et al. |
| 5,523,180 A * | 6/1996 | Armand .................... 429/188 |
| 5,548,055 A | 8/1996 | Narang et al. |
| 5,549,989 A | 8/1996 | Anani |
| 5,558,961 A | 9/1996 | Doeff et al. |
| 5,567,401 A | 10/1996 | Doddapaneni et al. |
| 5,578,395 A | 11/1996 | Yoshimura et al. |
| 5,605,773 A | 2/1997 | Ellgen |
| 5,609,975 A | 3/1997 | Hasegawa et al. |
| 5,620,812 A | 4/1997 | Tahara et al. |
| 5,626,635 A | 5/1997 | Yamaura et al. |
| 5,631,104 A | 5/1997 | Zhong et al. |
| 5,631,105 A | 5/1997 | Hasegawa et al. |
| 5,638,672 A | 6/1997 | Furukawa |
| 5,639,438 A | 6/1997 | Ellgen |
| 5,695,887 A | 12/1997 | Amatucci et al. |
| 5,700,597 A | 12/1997 | Zhong et al. |
| 5,705,291 A | 1/1998 | Amatucci et al. |
| 5,783,332 A | 7/1998 | Amine et al. |
| 6,150,459 A | 11/2000 | Mayes et al. |
| 6,207,749 B1 | 3/2001 | Mayes et al. |
| 6,787,232 B1 | 9/2004 | Chiang et al. |

FOREIGN PATENT DOCUMENTS

| | | |
|---|---|---|
| DE | 44 47 578 A1 | 4/1996 |
| EP | 0 421421 A1 | 4/1990 |
| EP | 0 531005 A2 | 10/1993 |
| EP | 0 580 865 A1 | 2/1994 |
| EP | 0 653 797 A1 | 5/1995 |
| JP | 02220358 A | 3/1990 |
| WO | WO 96/10538 A1 | 4/1996 |
| WO | WO 96/16450 A1 | 5/1996 |
| WO | WO 97/26683 A1 | 7/1997 |
| WO | WO 98/38648 A1 | 9/1998 |
| WO | WO 98/46528 A1 | 10/1998 |

OTHER PUBLICATIONS

Cao, Y. et al., *Appl. Phys. Letters*, 68: 3218–3220, 1996.

Li, J. et al., *Makromol. Chem.*, 192: 3043–3050, 1991.

Lobitz, P. et al., *Solid State Ionics*, 58: 41–48, 1992.

Molenda, J. et al., Physica Status Solidi., 165: 419–433, 1991.

Novikov, D. L. et al., *Physical Review*, 49: 15830–15835, 1994.

Ohzuku, T. et al., *J. Electrochemical Society*, 142: 4033–4039, 1995.

Almdal, K., et al., Communications to the Editor, Macromolecules 1990, 4336–4338.

Amatucci, G. G., "Surface treatments of $Li_{1+2}MN_{2-x}O_4$ spinels for improved elevated temperature performance," *Solid State Ionics*, 104: 13–25, 1997.

Armstrong, R. et al., "Synthesis of layered $LimnO_2$ as an elevated temperature performance,"*Letters to Nature*, 381: 499–500, 1996.

Barker, M. C. et al., "The Preparation and Characterisation of Polystyrene/Poly(ethylene Oxide) AB Block Copolymers," *Colloids and Surfaces*, 8:289–295, 1983.

Bates, Franks S., "Block Copolymers near the Microphase Separation Transition. 2. Linear Dynamic Mechanical Properties," Macromolecules 1984, 17, 2607–2613.

Benson, R. S. et al., "Synthesis and Characterization of Styrene/Isoprene/Ethylene Oxide Block Copolymers,"*J. Polymer Sci.*, 23: 399–410, 1985.

Billman, J.F., et al., "Structure and Phase Behavior in Five–Conponent Microemulsions," Langmuir 1900, 6, 611–620.

Billman, J.F. et al., "Structure and Phase Behavior in Four–Conponent Nonionic Microemulsions,"*Langmuir*, 7: 1609–1617, 1991.

Candaum, F. et al., "Synthesis and Characterization of polystyrene–poly(ethylene oxide) graft copolymers,"*Polymer*, 18: 1253–1256, 1977.

Capitaine, F., et al., "A new variety of LiMnO2 with a layered structure,"*Solid State Iconics*, 89, (1986), pp. 197–202.

Chen, L. Q., "Computer Simulation of Spinodal Decomposition in Ternary Systems, *Acta Metall. Mater.*, "42(10): 3503–3513, 1994.

Derand, H. et al., "Synthesis and Characterization and Anionic Graft Copolymers Containing Poly(ethylene oxide) Grafts,"*J. Polymer Sci.*, 33: 571–579, 1995.

Ding, J. et al., "Use of Crown Ether in the Aniomic Polymerization of Propylene Oxide —3. Preparation and Micellization of Diblock–Copoly (Oxypropylene/Oxyethylene)," *Eur. Polym. J.*, 27(9): 901–905, 1991.

Energy Lab Newsletter, Jul.–Dec. 1996.

Giles, J. R. et al., "Synthesis and Characterization of ABA block copolymer–based polymer electrolytes,"*Polymer*, 28: 1977–1981, 1987.

Gray, F.M. et al., "Novel Polymer Electrolytes Based on ABA Block Copolymers,"*Macroelecules*, 21: 392–397, 1988.

gummow, R.J., et al., "A Relinvestigation of the Structures of Lithium–Cobalt–Oxides with Neutron–Diffraction Data," *Mat. Res. Bull.*, 28, (1993),pp. 1177–1184.

Ichino, T., et al., "New Solid Polymer Electrolytes Prepared from Styrene–Butadiene Copolymers Latics,"*J. Polymer Sci.*, 31, (1993), pp. 589–591.

Johnson, G. K. et al., "Dispersion Morphology Diagram for ThreePhase, "Micromulsion" Emulsion. 2. "Disappearance" of Morphology–Transition Lines,"*J. Phys. Chem.*, 98, (1994), pp: 12097–12102.

Johnson, G. K. et al., "Electrical Conductivities of Three–Phase Emulsions. 2. $C_6H_{13}(OC_2H_4)_2OH$/n–Tetradecane/Water with NonWetting Middle Phases,"*Langmuir*, 10:2523–2527, 1994.

Karis, T. E. et al., "Rheology of the Lower Critical Ordering Transition, "*Macromolecules*, 28: 1129–1134, 1995.

Khan, I. M. et al., "Synthesis and Colloidal Behavior of Polystyrene–b–Poly(Ethylene Oxide) Block Copolymer, " *Eur. Polym. J.*, 23(3), (1987), pp. 191–194.

Khan, I. M. et al., "ABA Triblock comb coplymers with oligo(oxyenthylene) side chains as matrix for ion transport[a],"*Makromol. Chem.*, 190: 1069–1078, 1989.

Koetschau, I. et al., "Orthorhombic $LiMnO_2$ as a High Capacity Cathode for Li–Ion Cells,"*J. Electrochem. Soc.*, 142, 9: 2906–2910, 1995.

Le Cras, F. et al., "Lithium intercalation in Li–Mg–Mn–O and Li–Al–Mn–O spinels,"*Solid State Ionics*, 89:203–213, 1996.

Le Dore C. et al., "Synthesis of Poly(Ethylene Oxide–Diene–Ethylene Oxide) Triblock Copolymers. Characterization and Use as Solid Polymer Electrolytes,"*Eur. Polymer J.*, 27: 1297–1302, 1991.

Leiber, L. et al., "Theory of Microphase Separation in Block Copypolymers,"*Macro*, 13, (1980), pp. 1602–1617.

Li, J. et al., "Synthesis and properties of poly(2,5,8,11,17, 20,23–octaoxa–pentacosyl methacrylate)–block–poly(4–vinylpyridine)," Makromol. Chem. 192, 3043–3050 (1991), pp. 3043–3050.

Linden, E. et al., "Conductivity Measurements on Amorphous PEO Copolymers,"*Solid State Ionics*, 28–30, (1988), pp: 994–1000.

Lipatov, Y. S. et al., "Effect of reaction Conditions on the Structure of Interpenetrating Polymer Networks, III. Kinetics of Semi–IPN Formation in the Presence of a Filler. Influence on Viscoelastic Properties,"*Polym. Networks Blends*, 4(1): 9–14, 1994.

Lobitz, P. et al., "Block copolymers of poly(ethylene oxide) materials for polymer electroytes (transport properties)," *Journal of Powers Sources* 43–44:467–472, 1993.

Matsumoto M. et al., "Ionics Conductivity of Duel–Phase Polymer Electrolytes Comprised of NBR/SBR Latex Films Swollen with Lithium Salt Solutions,"*J. Electrochem. Soc.*, 141: 1989–1993, 1994.

Mayes, A. et al., "Microphase separations in multiblock copolymer melts,"*J. Chem. Phys.*, 91(11), (1989), pp. 7228–7235.

Nagaoka, K. et al., "High Ionic Conductivity in Poly (dimethyl) Siloxane–co–Ethylene Oxide) Dissolving Lithium Perchlorate,"*J. Polymer Sci.,* 22: 659–663, 1984.

Nazri, G. A. et al., "Synthesis, Characterization, and Electrochemical Performance of Substituted Layered Transition Metal Oxides $LiM^{1-y}M'_yO_2$(M=B and Al),"*Mat. Res. Soc. Symp. Proc.,* 453, (1997), pp. 635–464.

Nesterov, A. E. et al., "Filler effects on the compatibility and phase separation kinetics of poly(vinyl acetate0–poly (methyl methacrylate) mixtures,"*Polymer,* 33:619–622, 1992.

Odegard, R. et al., *In Situ* Formation of Polypyrrole/ PEO–$LiCF_3SO^3$ Composites by Pulsed Potentiostatic Electropolymerization, *J. Electrochem. Soc.,* 136: 1811–1817, 1989.

Ohzuku, T. et al., Synthesis and Characterization of $LiAl_{1/4}Ni_{3/4}O_2$(R3m) for Lithium–Ion (Shuttlecock) Batteries, *J. Electrochemical Society,* 142: 4033–4039, 1995.

Ohzuka, T. et al., $L1MnO_{2\ As}$ Cathode For Secondary Lithium Cell. *Chemistry Express,* Vol. 7, No. 3, pp. 193–196(1992) *Kinki Chemical Society, Japan.*

Rosendale, J.H. et al., "Rheology of Ordered and Disordered Symmetric Poly(ethylenepropylene)–Poly(ethylethylene) Diblock Copolymer,"*Macro.,*23, (1990), pp: 2329–2338.

Smith, D. H. et al., Electrical Conductivities of Three–Phase Emulsions. 1. Strongly Wetting Middle Phase, *Langmuir,* 10: 2516–2522, 1994.

Vitins, G. et al., Lithium Interaction into Layered $LiMnO_2$, *J. Electrochem Soc.,* 144: 2587–2592, 1997.

Watanabe, M. et al., Morphology and Ionic Conductivity of Polymer Coplexes Formed by Segmented Polyehter Poly- (urethane urea) and Lithium Perchlorate, *Macromolecules,* 18: 1945–1950, 1985.

Wilson, D. J. et al., Synthesis of Block Copolymers Based on Oxyethylene Chains and Their Use as Polymer Electrolytes, *British Polymer Journal,* 22: 129–135, 1990.

Xie, H. et al., Molecular Design Synthesis and Properties of Six Kinds of Multiphase (Styrene–Ethylene Oxide) Copolymers, *Chinese J. Polymers Sci.,* 9: 1–31, 1991.

Yao, N., WAXS Studies on Crystalline Behavior of Polymethyl Methacrylate–Polyethylene Oxide Graft Copolymers and Their Ionic Complexes, *J. Macromol. Sci. Phys.,* B30(3):225–243, 1991.

Yu, I. et al., "Theoretical Investigation of the Stability and Non–Empirical Quantum Chemical Calculation for the $B_6H_6^{2-}$Anion and its Protonated and Lithium Derivatives," *Doklady Akademii Nauk*SSR, 291, (1986), pp: 635–638.

* cited by examiner

*Primary Examiner*—Mark Ruthkosky
(74) *Attorney, Agent, or Firm*—Wolf, Greenfield & Sacks, P.C.

(57) ABSTRACT

Solid battery components are provided. A block copolymeric electrolyte is non-crosslinked and non-glassy through the entire range of typical battery service temperatures, that is, through the entire range of at least from about 0° C. to about 70° C. The chains of which the copolymer is made each include at least one ionically-conductive block and at least one second block immiscible with the ionically-conductive block. The chains form an amorphous association and are arranged in an ordered nanostructure including a continuous matrix of amorphous ionically-conductive domains and amorphous second domains that are immiscible with the ionically-conductive domains. A compound is provided that has a formula of $Li_xM_yN_zO_2$. M and N are each metal atoms or a main group elements, and x, y and z are each numbers from about 0 to about 1. y and z are chosen such that a formal charge on the $M_yN_z$ portion of the compound is (4-x). In certain embodiments, these compounds are used in the cathodes of rechargeable batteries. The present invention also includes methods of predicting the potential utility of metal dichalgogenide compounds for use in lithium intercalation compounds. It also provides methods for processing lithium intercalation oxides with the structure and compositional homogeneity necessary to realize the increased formation energies of said compounds. An article is made of a dimensionally-stable, interpenetrating microstructure of a first phase including a first component and a second phase, immiscible with the first phase, including a second component. The first and second phases define interphase boundaries between them, and at least one particle is positioned between a first phase and a second phase at an interphase boundary. When the first and second phases are electronically-conductive and ionically-conductive polymers, respectively, and the particles are ion host particles, the arrangement is an electrode of a battery.

28 Claims, 19 Drawing Sheets

20 µm

NON-CROSSLINKED, AMORPHOUS, BLOCK COPOLYMER ELECTROLYTE FOR BATTERIES

This is a divisional application of U.S. patent application Ser. No. 09/284,447, filed Jun. 24, 1999 which is a national stage of and claims priority to International Application No. PCT/US97/18839 filed Oct. 10, 1997, which claims priority to U.S. Provisional Application No. 60/028,342, filed Oct. 11, 1996; U.S. Provisional Application No. 60/028,341, filed Oct. 11, 1996; U.S. Provisional Application No. 60/028,278, filed Oct. 11, 1996; and U.S. Provisional Application No. 60/053,876, filed Jul. 28, 1997.

This invention was made with government support under Contract Number DEFC07-94ID13223 awarded by the U.S. Department of Energy and Grant Number NIH-5P30-ES02109 awarded by the National Institutes of Health. The government has certain rights in the invention.

BACKGROUND OF THE INVENTION

1. Field of the Invention

The present invention relates generally to batteries, and more particularly to batteries that can include one or more of a block copolymeric electrolyte, lithium dichalcogenide compounds having a substantial amount of oxygen p-level characteristic at the Fermi energy level, and an electrode, one or more of which can be used with a lithium solid polymer electrolyte battery.

2. Background of the Invention

Rechargeable batteries enjoy an enormous and constantly growing global market due to their implementation in, for example, cellular phones, laptop computers and other consumer electronic products. In addition, the development of electrically-powered vehicles represents an immense potential market for these batteries. The increased interest in lithium intercalation compounds stems from their use in rechargeable batteries and, in particular, lithium solid state batteries.

Intercalation refers to a reaction in which ions, atoms or molecules penetrate between the layers of a solid material to form intercalation compounds. For example, alkali metal ions are known to insert between graphite layers to form intercalation compounds. Recently, dichalcogenides, such as dioxides and disulfides, have become increasingly popular for use in the intercalation of lithium ions. When dioxides are used, the overall reaction occurs as follows:

$$(x_2-x_1) \text{Li} + (x_2-x_1) e^- + \text{Li}_{x_1}\text{MO}_2 \rightarrow \text{Li}_{x_2}\text{MO}_2 \quad (1)$$

where M represents a metal or main group element and $x_2 > x_1 \geq 0$.

In this reaction, lithium is placed in the structure of the dioxide without major changes to the structure.

The lithium solid polymer electrolyte rechargeable battery is an attractive technology for rechargeable battery applications due to its high predicted energy density, freedom in battery configuration, minimal potential for environmental and safety hazard, and low associated materials and processing costs. The lithium battery is charged by applying a voltage between the battery's electrodes, which causes lithium ions and electrons to be withdrawn from lithium hosts at the battery's cathode. Lithium ions flow from the cathode to the battery's anode through a polymer electrolyte to be reduced at the anode, the overall process requiring energy. Upon discharge, the reverse occurs; lithium ions and electrons are allowed to re-enter lithium hosts at the cathode while lithium is oxidized to lithium ions at the anode, an energetically favorable process that drives electrons through an external circuit, thereby supplying electrical power to a device to which the battery is connected.

The dioxide serves as lithium hosts in rechargeable batteries by intercalating lithium. The battery voltage derived from such an intercalation reaction depends on the difference in the chemical potential for lithium between the anode and cathode material:

$$V(x) = \frac{-\mu_{Li}^{cathode}(x) - \mu_{Li}^{anode}}{zF} \quad (2)$$

where z is the electron transfer associated with Li intercalation, usually assumed to be equal to 1, and F is the Faraday constant. By integrating equation (2) between charged and discharged limit one obtains the average battery voltage arising from the intercalation reaction $$V_{average} = \frac{-1}{x_2 - x_1} [E_{Li_{x_2}MO_2} - E_{Li_{x_1}MO_1} - (x_2 - x_1)E_{Li}] \quad (3)$$

The right-hand side of equation (3) is the energy associated with the formation of the discharged compound ($\text{Li}_{x_2}\text{MO}_2$) from the charged compound ($\text{Li}_{x_1}\text{MO}_2$). Hereafter $x_2$ is set to 1, $x_1$ is set to 0, and the right hand side of equation (3) is referred to as the "formation energy" of the intercalation compound $\text{LiMO}_2$. The anode reference state is taken to be metallic Li although this has no significance for the results.

Currently known compounds such as $\text{LiCoO}_2$ and $\text{LiMn}_2\text{O}_4$ have formation energies between 3 and 4 eV. For many applications a high voltage and low weight are desirable for the cathode as this leads to high specific energy. For example, for electrical vehicle applications the energy-to-weight ratio of the battery determines the ultimate driving distance between recharging.

With this goal in mind, the research into lithium intercalation compounds that has been conducted thus far has focused primarily on the synthesis and subsequent testing of various dioxide compounds. In preparing these compounds, workers have been guided by the conventional belief that, during intercalation of the lithium ion, the electron is transferred to the metal or main group atom of the dioxide. These efforts have led to the development of a variety of compounds, including $\text{Li}_x\text{CoO}_2$, $\text{Li}_x\text{NiO}_2$, $\text{Li}_x\text{Mn}_2\text{O}_4$, and $\text{Li}_x\text{V}_3\text{O}_{13}$. In addition, $\text{Li}_x\text{TiS}_2$ and other disulfides have been investigated for use in lithium intercalation. However, each of these compounds suffers from at least one shortcoming. For example, $\text{Li}_x\text{CoO}_2$, $\text{Li}_x\text{V}_3\text{O}_{13}$ and $\text{Li}_x\text{TiS}_2$ are relatively expensive to prepare. Moreover, $\text{Li}_x\text{NiO}_2$ is comparatively difficult to process. Furthermore, $\text{Li}_x\text{Mn}_2\text{O}_4$ possesses a limited capacity for providing energy.

Systems with multiple metals have been described in several patents and publications. Ohzuku, et al., "Synthesis and Characterization of Li $\text{Al}_{1/4}\text{Ni}_{3/4}\text{O}_2$ for Lithium-Ion (Schuttle Cock) Batteries," *J. Electrochem. Soc.*, vol. 142, p. 4033 (1995), describe the mixed-metal composition of the title and report electrochemical properties thereof. The purpose of the preparation of the material, according to the authors, is to prevent overcharging-related degradation of a cathode.

Nazri, et al., in "Synthesis, Characterization, and Electrochemical Performances of Substituted Layered Transition Metal Oxides, $\text{LiM}_{1-y}\text{M}'_y\text{O}_2$ (M'=Ni and Co, M'=B and Al)," *Mat. Res. Soc. Symp. Proc.*, vol. 453, p. 635 (1997), describe addition of Al at various levels to $LiNiO_2$ and $LiCoO_2$ and investigation of related voltage change.

While the above and other reports represent, in some cases, interesting lithium compounds for electrochemical devices, on the whole the prior art is directed towards relatively high-temperature firing of compounds resulting in generally low-energy state products. For example, the above-cited reports do not appear to reflect the recognition or realization that $LiAlO_2$ of the $\alpha$-$NaFeO_2$ structure has a higher formation energy than previously studied oxides such as $LiCoO_2$ and $LiNiO_2$, or that additions of $LiAlO_2$ to another oxide of the $\alpha$-$NaFeO_2$ structure will raise the formation energy of said oxide. Instead, the results of Ohzuku et al. and Nazri et al. appear to show no significant voltage increase in batteries based on such compositions, which would discourage aspects of the present invention.

In general, many prior art mixed-metal compositions exhibit phase separation, and there is a general lack of appreciation that intercalation compounds of the present invention, described below, can play a role in high-energy electrochemical devices. Hence, it remains a challenge in the art to provide dichalcogenide compounds for use as lithium intercalation compounds that are relatively light-weight, inexpensive and easy to process and that have comparatively large formation energies. In addition, it is desirable to provide methods of predicting which dichalcogenide compounds may be most useful in lithium intercalation in order to reduce the time, effort and cost associated with the development of these compounds. Furthermore, methods must be provided for the synthesis and processing of these predicted compounds in the desired structure and with the desired homogeneity necessary to realize the predicted formation energies.

Development of commercially-viable lithium solid polymer electrolyte batteries has been hindered by complications, in particular complications involving the electrolyte. An inherent inverse relationship between ionic conductivity and dimensional stability exists in most known polymer electrolytes. That is, prior art electrolytes typically demonstrate good ionic conductivity, or good dimensional stability, but not both. Dimensional stability can be achieved by crosslinking, crystallization, glassification, or the like, but these arrangements generally impede ionic conductivity since conductivity requires a significant degree of polymer chain mobility.

For example, in linear chain polyethylene oxide (PEO) lithium salt electrolytes, crystallinity can severely hinder the mobility of the polymer chains, compromising room temperature ionic conductivities. Above the melting point of this system ($T_m$=65° C.), ionic conductivity increases significantly, but at these temperatures PEO behaves rheologically as a viscous fluid, losing its dimensional stability and hence its distinct advantage over liquid electrolytes that display much higher conductivities.

Since high ionic conductivity in PEO is characteristic of an amorphous state, most prior developmental efforts have concentrated on reducing crystallinity through the addition of plasticizers or modification of the polymer architecture through random copolymerization or the use of electrolytic pendant groups. However, these strategies generally have yielded materials with poor mechanical properties, i.e., materials that behave more like liquids than solids since, as crystallinity in PEO is reduced via these techniques, dimensional stability necessary for application in solid state batteries is compromised.

Crosslinking has been used as a technique for imparting mechanical rigidity to polymeric electrolytes, a common synthetic approach being to prepare network-type structures via irradiation or chemical crosslinking. The ionic conductivity of crosslinked systems is, however, inherently hindered by the presence of the crosslinks, as the crosslinks suppress chain mobility. Furthermore, crosslinked networks of solid polymer electrolyte materials do not flow and are insoluble, therefore multiple processing steps are required for preparation of electrolytes and arrangement of the electrolytes in batteries. Additionally, crosslinked materials tend to be non-recyclable.

Cathodes in state-of-the-art lithium solid polymer electrolyte batteries contain lithium ion host materials, electronically conductive particles to electronically connect the lithium ion hosts to a current collector (i.e., a battery terminal), and ionically-conductive particles to ionically connect the lithium ion hosts to a lithium-conducting polymer electrolyte. The lithium ion host particles typically are particles of lithium intercalation compounds. Typically, the electronically conductive particles are made of a substance such as carbon black or graphite, and the ionically conductive material is a polymer such as polyethylene oxide. The resulting cathode includes a mixture of particles of average size typically on the order of no less than about 100 microns.

For reliable operation, good contact between particles must be maintained to ensure an electronically-conductive pathway between lithium host particles and the external circuit, and a lithium-ion-conductive pathway between lithium host particles and the polymer electrolyte. In typical prior art arrangements, however, expansion and contraction of the mixture of particles occurring naturally during the course of charging and discharging, and due to temperature change of the environment in which the cathode is used, can result in loss of inter-particle contact, in particular, disconnection of the lithium host particle/electronically conductive particle interface. Moreover, repeated cycling often results in increased electrical resistance within the cathode due to passivation of the intercalation compound surface.

The available literature contains descriptions of a variety of solid polymer electrolytes. For example, Nagaoka, et al., in an article entitled, "A High Ionic Conductivity in Poly (dimethyl siloxane-co-ethylene oxide) Dissolving Lithium Perchlorate," Journal of Polymer Science: Polymer Letters Edition, Vol. 22, 659–663 (1984), describe ionic conductivity in poly(dimethyl siloxane-co-ethylene oxide) doped with $LiClO_4$. Bouridah, et al., in an article entitled, "a Poly (dimethylsiloxane)-Poly(ethylene-oxide) Based Polyurethane Networks Used as Electrolytes in Lithium Electrochemical Solid State Batteries," *Solid State Ionics*, 15, 233–240 (1985) describe crosslinked polyether-grafted PDMS filled with 10 wt % $LiClO_4$, and its ionic conductivity and thermal stability. Matsumoto, et al., in an article entitled, "Ionic Conductivity of Dual-Phase Polymer Electrolytes Comprised of NBR-SBR Latex Films Swollen with Lithium Salt Solutions," *J. Electrochem. Soc.*, 141, 8 (August, 1994) describe a technique involving swelling poly(acrylonitrile-co-butadiene) rubber and poly(styrene-co-butadiene) rubber mixed latex films with lithium salt solutions resulting in dual-phase polymer electrolytes.

The patent and academic literature contains descriptions of a variety of electrodes for polymer batteries. For example, Minett, et al. in "polymeric insertion electrodes, *Solid State Ionics*, 28–30, 1192–1196 (1988)" describe a mixed ionic/electronic conducting polymer matrix formed by exposing a film of polyethylene oxide soaked in pyrrole to aqueous $FeCl_3$ solution or by exposing a film of $FeCl_3$-impregnated polyethylene oxide to pyrrole vapor. Films were assembled into all-solid-state electrochemical cells using lithium as the anode and $PEO_8LiClO_4$ as electrolyte. U.S. Pat. No. 4,758,483 (Armand) describes a solid polymeric electrolyte that can be used in a composite electrode. The electrolyte is reported to include an ionic compound in solution in a copolymer of ethylene oxide and a second unit that is preferably an ethylene polyoxide structure including side-group radicals that introduce structural irregularities into the system reducing or eliminating crystallinity. A lithium salt, such as lithium perchlorate, is dissolved in the polymer system. Li and Khan, in an article entitled "Synthesis and properties of poly(2,5,8,11,14,17,20,23-octaoxapentacosyl methacrylate)-block-poly(4-vinylpyridine)", *Makromol. Chem.* 192, 3043–3050 (1991) describe block copolymers of a soft, oxyethylene phase doped with $LiClO_4$ and a hard, 4-vinylpyridine phase doped with a tetracyanoquinodimethane. The soft phase is rendered ionically conductive and the hard phase is rendered electronically conductive, and the copolymer can serve as a polymer electrode. The block copolymer shows microphase separation as indicated by the presence of two glass transition temperatures.

Significant effort has been directed toward viable solid polymer electrolytes, electrodes, and improved ion host particles, yet improvements are greatly needed. Therefore, it is an object of the present invention to provide lithium intercalation compounds that have reduced costs associated with their preparation and processing and that possess increased formation energies and lighter weight.

It is a further object of the present invention to provide methods of predicting which lithium intercalation compounds may be most useful in lithium batteries to decrease the effort and expense associated with the development of these compounds.

It is still another object of the invention to provide methods of processing lithium intercalation oxides with a high level of compositional homogeneity, as this is necessary to realize the increased formation energies of said compounds.

It is still another object of the invention to provide an electrolyte for batteries that exhibits good ionic conductivity, good dimensional stability, and that is easily processed.

It is still another object of the invention to provide an improved electrode for batteries that is dimensionally-stable, robust, that maintains good ionic conduction between the ion host and electrolyte and good electronic connection between the ion host and current collector after repeated cycling, and that is easily and economically manufactured.

SUMMARY OF THE INVENTION

The present invention provides improved ion host particles, polymer electrolytes, and electrodes for lithium batteries. Each is useful separately in a battery, and any combination of these improved products is embraced by the invention. That is, one aspect involves improved host particles that can be used in a variety of batteries, one aspect involves an improved electrode, another aspect involves the improved ion host particles of the invention incorporated into an improved cathode of the invention, another aspect involves the improved electrolyte of the invention, another aspect involves the electrolyte in combination with an electrode of the invention that may or may not include the ion host particles of the invention, another aspect involves the electrolyte with any electrode incorporating the ion host particles of the invention, and another aspect involves a combination of host particles, electrolyte, and electrode of the invention.

In one aspect, the present invention provides a compound having a formula of $Li_xM_yN_zO_2$. M and N are each metal atoms or main group elements, and x, y and z are each numbers from about 0 to about 1. y and z are chosen such that a formal charge on the $M_yN_z$ portion of the compound is (4-x). In one embodiment each oxygen atom of the compound has at least about 20% p-level characteristic at the Fermi energy of the compound as measured according to a pseudo potential technique. In another embodiment, the composition has a charging voltage of at least about 2.5 volts. In yet another embodiment the composition which crystallizes in the $\alpha$-$NaFeO_2$, the orthorhombic $LiMnO_2$ or the tetragonal spinel $Li_2Mn_2O_4$ structure.

In another embodiment, the present invention provides a composition having a formula $LiAl_yM_{1-y}O_2$, where M is Ti, V, Cr, Mn, Fe, Co, Ni, Cu, or Zn. This compound, as well as other compounds of the invention, is not phase separated, but is homogeneous at scale measurable by x-ray crystallography.

In a further illustrative embodiment, the present invention provides a method of making this compound. In certain embodiments, the method includes calculating the p-level characteristic of each oxygen atom of the compound using a first principles method of solving a Schrodinger equation, such as the pseudo potential method.

A variety of methods of making compositions of the invention are provided according to another aspect, including dispersing precursor powders, drying the suspension, and heating the powder to cause crystallization, and other precipitation and co-precipitation techniques as described herein.

In another aspect the composition of the invention can define an ion host component of a combination of an ion host component, an electrically conductive material in electrical communication with the host component, and a lithium conductive, dimensionally-supportive matrix positioned to allow lithium ion communication with the host component.

In another aspect, the present invention provides a polymer electrolyte including a non-crosslinked association of a plurality of block copolymer chains. Each of the chains includes at least one ionically-conductive block and at least one second block immiscible with the ionically-conductive block. The association is amorphous and non-glassy through the entire range of typical battery service temperatures, that is, through the entire range of at least from about 0° C. to about 70° C., preferably from about −25° C. to about 80° C., more preferably from about −40° C. to about 100° C. The chains are arranged in an ordered nanostructure including a continuous matrix of amorphous ionically-conductive domains defined by association of ionically-conductive blocks, and amorphous second domains, immiscible with the ionically-conductive domains, defined by association of second blocks.

Another aspect involves the polymer electrolyte of the invention constructed and arranged as an electrolyte in a battery. The battery can be an ionic solid state battery such as a lithium solid battery. In this arrangement the electrolyte will be in ionic communication with both a cathode and an anode which are each in electric communication with an external circuit.

In a further aspect, the present invention provides an article including a dimensionally-stable, interpenetrating microstructure of a first phase including a first component and a second phase, immiscible with the first phase, including a second component. The first and second phases define interphase boundaries between them, and at least one particle is positioned between a first phase and a second phase at an interphase boundary In one embodiment, the first phase is made of an electronically-conductive polymer, the second phase is an ionically-conductive polymer, and the particle is an ion host particle. This arrangement can define an electrode in a battery. The ionically-conductive polymer can be the polymer electrolyte of one aspect of the invention. The ion host particle can be made of a composition according to one aspect of the invention.

In a further aspect, the present invention provides an electronically-conductive polymer, an ion host material in electronic communication with the electronically-conductive polymer, and an ionically-conductive polymer in ionic communication with the ion host material. The ion host material can be an ion host particle, the article including a plurality of ion host particles each in electronic communication with the electronically-conductive polymer and in ionic communication with the ionically-conductive polymer. This arrangement, in one aspect, can define an electrode material for a battery.

In a further aspect, the present invention provides a method of making an article. The method involves creating a melt of components, including a first component and a second component and at least one particle. The system can be formed by a reduction of temperature of a disordered melt, e.g. the melt can be allowed to solidify and the first component to phase separate from the second component to form an interpenetrating microstructure of a first phase including the first component and a second phase, immiscible with the first phase, including the second component. The particle migrates to and is positioned at an interphase boundary defined between the first and second phases. The first and second phases are, according to one embodiment of the invention, electronically and ionically-conductive polymers, respectively. The ionically-conductive phase can be the polymer electrolyte according to one aspect of the invention, and the particle can be a composition according to that aspect of the invention.

In a further aspect, the present invention provides a method involving withdrawing, from an ion host material, an ion into an ionically-conductive polymer and an electron into an electronically-conductive polymer. In one embodiment, the method involves simultaneously withdrawing a plurality of ions and electrons from a plurality of ion host particles. The ion host particles can be made of the composition of the invention, and the ionically-conductive polymer can be the polymer electrolyte of the invention.

In another aspect, the present invention provides a system including a first ion host material having a first potential associated with withdrawal of an ion from the first material, a second ion host material having a second potential associated with withdrawal of an ion from the second material, and an ionically-conductive material in ionic communication with each of the first and second ion host materials. The first and second ion host materials can be made of the composition of the invention, and the ionically-conductive material can be the polymer electrolyte of the invention.

The invention also provides a solid state polymer electrolyte battery assembly. The assembly includes an anode, a cathode, a first electrolyte in ionic communication with each of the anode and cathode, and an external circuit in electronic communication with each of the anode and cathode. At least one of the anodes or cathodes is defined by a bicontinuous, interpenetrating microstructure of a first, electronically-conductive component, a second, ionically-conductive component immiscible with and phase-separated from the electronically-conductive component at typical battery surface temperatures, and ion host particles positioned at interphase boundaries between the electronically-conductive and ionically-conductive components.

Other advantages, novel features, and objects of the invention will become apparent from the following detailed description of the invention when considered in conjunction with the accompanying drawings. In the drawings, components that can be common to various figures are represented by common numerical designations.

DETAILED DESCRIPTION

The following co-pending, commonly-owned, U.S. Pat. Applications are incorporated herein by reference: Ser. No. 60/028,342, filed Oct. 11, 1996 by Mayes, et al., entitled ELECTRODE FOR SOLID POLYMER ELECTROLYTE BATTERIES; Ser. No. 60/028,341, filed Oct. 11, 1996 by Mayes, et al., entitled POLYMER ELECTROLYTE FOR BATTERIES; Ser. No. 60/053,876, filed Jul. 28, 97 by Ceder, et al., entitled INTERCALATION COMPOUNDS AND METHODS OF THEIR MANUFACTURE AND USE.

The present invention provides improved battery components, combinations of these components, and methods of their manufacture and use.

Figure 1:
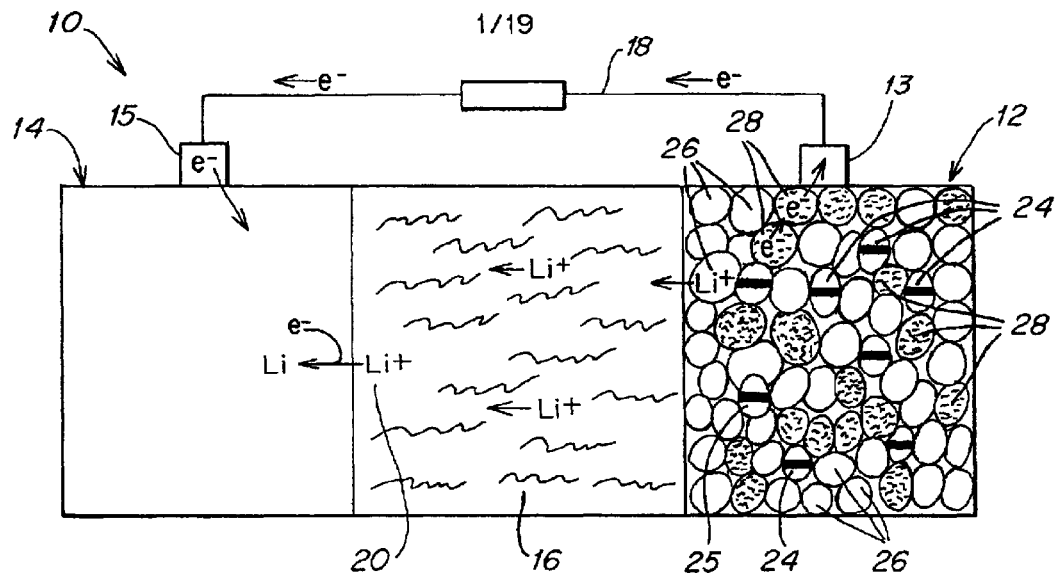
FIG. 1 is a schematic representation of a rechargeable battery including lithium dichalcogenide intercalation compounds in accordance with the prior art.

The invention provides significant improvement as compared to prior art lithium polymer electrolyte batteries, for example the battery illustrated schematically in FIG. 1. The prior art battery 10 of FIG. 1 includes a cathode 12, an anode 14, a solid polymer electrolyte 16 in ionic communication with cathode 12 and anode 14, and an external electrical circuit 18 in electronic communication with cathode 12 and anode 14 via terminals 13 and 15, respectively. As used herein "ionic communication" and "electronic communication" is meant to define a relationship between components in which ions or electrons, respectively, can be made to flow through a battery with minimal resistance, that is, with low enough resistance that the battery is operable. For example, when cathode 12 and anode 14 are in contact with solid polymer electrolyte 16, cathode 12 and anode 14 are in ionic communication with the solid polymer electrolyte, and in ionic communication with each other.

Cathode 12 includes ionically-conductive material 26 and electronically-conductive particles 28 admixed with lithium intercalation compound particles 24. For fabrication of such a cathode, lithium intercalation compound particles 24, ionically-conductive material 26, and electronically-conductive particles 28 are provided in a random mixture in the cathode. The particles tend to have a size in the 10 to 100 micron range.

Battery 10 is illustrated in a charging mode, that is, a mode in which energy is introduced into the battery and stored therein by applying an electrical potential across terminals 13 and 15. This results in a reaction within the battery that proceeds in an energetically uphill direction. In particular, in the charging mode electrons are driven into anode 14 from terminal 15 and combined with lithium ions 20 to produce lithium or Li in anode 14. For this reaction to occur, electrons are drawn from cathode 12 via terminal 13 into the external circuit and lithium ions 20 are drawn from cathode 12 into electrolyte 16 and are made to flow through polymer electrolyte 16 in a direction from the cathode toward the anode. Within cathode 12, electrons and lithium ions are drawn from lithium intercalation compound particles 24 and flow to terminal 13 and polymer electrolyte 16, respectively.

The chemical/physical process occurring within the battery during charging is energetically disfavored, that is, energetically uphill, since net energy is required to remove a lithium ion and electron from lithium intercalation compound particles 24 and simultaneously to reduce a lithium ion 20 to lithium at the interface between anode 14 and polymer electrolyte 16. In particular, while reduction of lithium ion to lithium releases energy, removal of a lithium ion and electron from a lithium host particle 24 requires significantly more energy. During discharge (use of the battery to power a device connected to external circuit 18) the reverse reaction occurs, and net energy is released.

Figure 2:
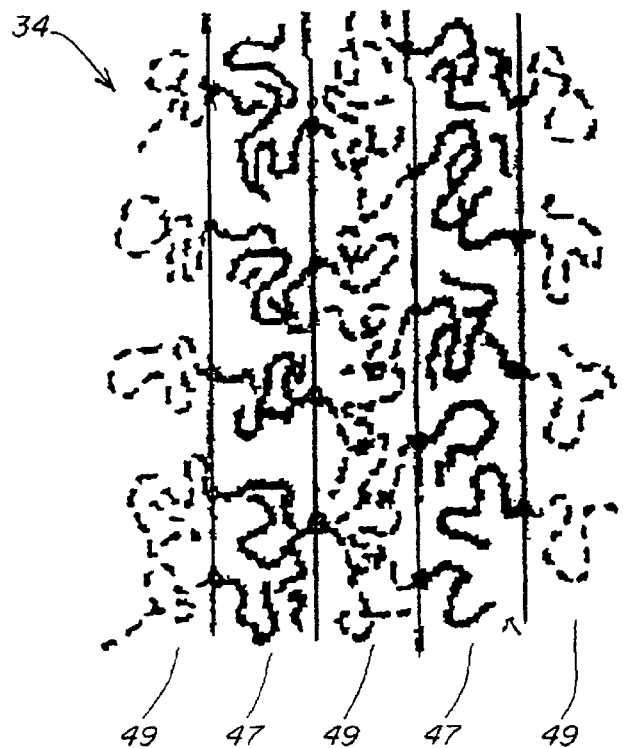
FIG. 2 illustrates schematically a polymer electrolyte in accordance with the invention.

FIG. 2 is a schematic drawing of a block copolymeric electrolyte 34 of the invention (which can be a diblock copolymer, triblock copolymer, or the like). Polymer electrolyte 34 is a block copolymer composition that is non-crosslinked, non-crystalline, and non-glassy at typical battery service temperatures (i.e., through the entire range of typical battery service temperatures, that is, through the entire range of at least from about 0° C. to about 70° C., preferably from about −25° C. to about 80° C., more preferably from about −40° C. to about 100° C.). The electrolyte is formed by block copolymer chains each including at least one ionically-conductive block 47 and at least one second block 49 immiscible with the ionically-conductive block, the second block typically being non-ionically-conductive. The blocks are selected such that, at an elevated temperature above typical battery service temperatures, or in solution in a suitable solvent, the blocks are segmentally mixed and, upon reducing temperature or precipitation from solution or evaporation of solvent from the solution, an ordered nanostructure (domain cross-section of less than about 200 microns, typically) is formed which includes a continuous matrix of amorphous ionically-conductive domains (doped with an appropriate salt) that are defined by association of the ionically-conductive blocks, and amorphous second domains, immiscible with the ionically-conductive domains, that are defined by association of second blocks.

Species for forming the ionically-conductive copolymer 34 should be selected according to the following criteria: Both blocks, at service temperatures, are amorphous, rheologically in a rubbery or melt state (well above Tg), and non-crystalline; the ionically-conductive blocks form continuous, ionically-conducting domains (when doped with an appropriate salt), upon microphase separation occurring from precipitation, or decrease in temperature, or evaporation of a solvent; and components used in the block copolymer form the ordered structure in a manner such that global dimensional stability of the copolymer exists in the absence of crosslinking, crystallization, or glassification, while chain mobility that provides high ionic conductivity remains high. As used herein, "microphase separation" means a process in which blocks of the copolymer are locally segregated to form ordered domains. Continuous, ionically-conductive pathways may be inherent to the equilibrium ordered morphology, or may result from defects in the ordered structure.

That is, the ionically-conductive polymer 34, according to preferred embodiments, is an association of block copolymer chains in which inter-block, non-covalent chemical attraction such as polar/polar or polar/induced polar interactions, including hydrogen bonding, or nonpolar/nonpolar interactions including van der Waals interactions, create association between the chains that allows for mobility required for good ionic conductivity, while maintaining dimensional stability required for a solid polymer electrolyte battery. This non-covalent, chemical attraction of like blocks to each other results in unique thermodynamic and rheological behavior. At high temperatures, or in solution, the block copolymers form isotropic phases in which the different blocks are segmentally mixed. Upon lowering the temperature or evaporating away the solvent, or upon precipitation from solution, the repulsion between unlike segments increases, causing the copolymer to phase separate locally into regions each composed of one of the two block copolymer components. These segregated regions organize into ordered nanostructures, the morphology of which is governed by the relative volume fractions of the different blocks. Global dimensional stability is imparted to the material.

The following discussion on miscibility will aid those of ordinary skill in the art in selecting suitable ionically-conductive and second blocks for ionically-conductive block copolymer 34. For a diblock copolymer of N total statistical segments, with a 50:50 volume composition, $\chi N > 10.5$ for block segregation, where $\chi$ is the Flory-Huggins interaction parameter, well known to one skilled in the art. The critical value of $\chi N$ is larger if the volume composition is different from 50:50. For asymmetric A-B diblock copolymer compositions, the value of $\chi$ required for block segregation can be calculated from a formula by L. Leibler (Macromolecules 13, 1602 (1980)), while for A-B-A triblock copolymers, a similar formula by A. M. Mayes and M. Olvera de la Cruz (J. Chem. Phys. 91, 7228 (1989)) can be employed to calculate values of $\chi$ required for phase separation for any composition and molecular weight. Those of ordinary skill in the art can carry out this determination technique, and can determine the critical composition for a given diblock or triblock copolymer of any N and composition.

The block copolymer preferred for the ionically-conductive polymer 34 offers unique processing advantages. The isotropic melt or solution can be processed into thin films as in traditional thermoplastic processing, and the required processing temperatures are tunable through variation of molecular weight and composition. Furthermore, such block copolymers can be made inexpensively, and have excellent recycling potential since the order-disorder transition is thermally reversible.

The molecular weight of the block copolymer chains of the ionically-conductive polymer should be selected to be high enough so that a segregated morphology in the service temperature range of battery operation is maintained. Specifically, the molecular weight is at least about 10,000, preferably at least about 15,000, more preferably at least about 25,000 Daltons, more preferably at least about 50,000 Daltons, more preferably still at least about 100,000 Daltons. Block copolymeric electrolyte 34 can include ionically-conductive blocks 47 and second blocks 49 (which can be non-conductive or preferably ionically conductive) as a minor phase, possessing high room-temperature mobility. The second blocks can be selected among non-ionically-conductive acrylates such as polydecyl methacrylate, polylauryl methacrylate, and the like (where decyl and lauryl can be replaced with moieties having a number of carbon atoms high enough that the glass transition temperature of the block is less than service temperature, and selected such that crystallization does not occur), polyalkyl acrylates, polydimethyl siloxane, polybutadiene, polyisoprene, and saturated polymers or copolymers derived from polybutadiene and polyisoprene such as polyethylethylene and polyethylenepropylene and copolymers thereof, and modified polystyrenes with flexible side chains (e.g., alkyl fluorocarbon or siloxane side chains) attached through the phenyl group. Species with Tg less than about 0° C. are preferred, more preferably less than about −10° C., more preferably less than about −25° C., and more preferably still less than about −40° C.

The ionically-conductive block can be defined by a polyethylene oxide (PEO) derivative material, in particular a PEO derivative that meets the criteria of Tg, lack of crystallinity and glassification as discussed above. The ionically-conductive block can be selected among species such as methoxy polyethylene glycol (PEG) methacrylate (referred to herein as MnG), methoxy PEG acrylate, and other acrylate and methacrylate polymers modified via, for example, a transesterfication reaction to include short polyethylene oxide (PEO) or polyethylene glycol (PEG) side chains, polybutadiene modified so as to include short PEO or PEG side chains, polystyrene similarly modified via a phenyl group reaction to include a PEO or PEG side groups, and the like. The ionically-conductive block also can be defined by an ionically-conductive polymeric material such as described by Ward, et al. in U.S. Pat. No. 5,051,211, incorporated herein by reference. Ionically-conductive polymeric material includes those materials made ionically-conductive via doping with an appropriate salt.

Each of the ionically-conductive and non-ionically conductive blocks can be a mixture of components, that is, each block can be, for example, a random copolymer of different components so long as one block is sufficiently ionically-conductive, and so long as the criteria herein including lack of crystallization and lack of glassy domains, and sufficient dimensional stability, at service temperatures, is achieved. In some instances, a block copolymer in which one block (or both blocks) is itself a copolymer such as a random copolymer, can result in a non-crystalline block copolymer that, with a more regular sequence of the same components along the chain backbone, would be crystalline. The ionically-conductive polymer domains can include, in addition to the ionically-conductive polymer block, a lower molecular weight, ionically-conductive species that segregates to the ionically-conductive domain of the block copolymer, thereby improving the ionic conductivity of the copolymer. Examples include polyethylene glycol dimethyl ether.

Block copolymeric electrolyte 34 includes, as described above, a continuous matrix of amorphous ionically-conductive domains defined by association of ionically-conductive blocks and an amorphous second domain, immiscible with the first domains defined by association of a second block that can be non-conductive or ionically-conductive. The continuous ionically-conductive domains define at least a continuous ionically-conducive pathway when the block copolymer is ordered due either to defects in the association, or inherent micro-phase separations. That is, the electrolyte makes use of self-assembling polymeric systems that are block copolymeric systems or blends of polymers, and that can include block copolymers, to form 1, 2 or 3-dimensional structures that are topologically connected to form at least a continuous ionic pathway. For example, lamellar self-assembled structures suitable for use in the invention are those constructed of a block copolymeric species that self-assembles to a lamellar structure including defects providing an topologically connected continuous ionically-conductive pathway. An ordered cylinder or sphere morphology columnar structure, self-assembled, is suitable where the continuous matrix phase is ionically-conductive. Bicontinuous periodic block copolymer morphologies such as a double gyroid arrangement, double diamond configuration, or the like, can be used. These structures are known to those of ordinary skill in the art.

Anionic synthesis is well-suited for the preparation of block copolymeric electrolyte 34 with well-defined molecular weights and compositions. For example, methoxypolyethyleneglycol methacrylate (MnG; available from Polysciences) can be initiated anionically to yield an amorphous polymer with a Tg of −60° C., and room temperature conductivities when doped with a Li salt near $10^{-5}$ S/cm, and diblock copolymers of MnG and lauryl methacrylate can be prepared by sequential addition of lauryl methacrylate to living MnG homopolymer. Alternatively, block copolymers can be prepared by the reaction of end-functionalized homopolymers, by addition polymerization of one block component onto an end-functionalized homopolymer, or by sequential addition of two monomer species in a living free radical polymerization. When doped with appropriate lithium salts, which are known in the art, the block copolymer can be rendered ionically-conductive, i.e., electrolytic. The block copolymeric electrolyte 34 can be prepared by melt processing such as melt pressing, or solvent casting techniques such as spin coating or evaporation. Technologies for synthesizing and processing such block copolymeric species are well-known to those of ordinary skill in the art.

Planning and simple screening tests can be used to select suitable components for use in block copolymeric electrolyte 34. First, the ionically-conductive and second blocks should be made of materials that are immiscible. Once a particular block copolymer is synthesized, it can be screened for suitability for use in the invention by analysis via differential scanning calorimetry. If two glass transition temperatures are observed, then the ionically-conductive and second blocks are immiscible, that is, the desired microphase separation has taken place. If only one glass transition temperature is observed, then the block components are miscible and microphase separation has not occurred, or the glass transition temperatures of the differing blocks are coincidentally similar. If one glass transition temperature is observed, another screening test involving small angle scattering or rheology measurements can determine whether phase separation has occurred. See Bates, F. *Macromolecules* 1984, 17, 2607; Rosedale, J. H.; Bates F. S. *Macromolecules* 1990, 23, 2329; Almdal, K; Rosedale, J. H.; Bates, F. S. *Macromolecules* 1990, 23, 4336. The existence of crystallinity is readily determined by thermal analysis techniques such as DSC or DTA, or by X-ray diffraction.

Another test involves subjecting the block copolymer to heat to determine its resistance to flow. If the material flows easily, microphase separation and resulting dimensional stability at the test temperature does not exist.

Described above is a copolymeric electrolyte useful in a battery. It is to be understood that the electrolyte can serve as an electrolyte in any kind of battery, preferably in a lithium (or other ion) solid state battery or in another device such as a fuel cell. In addition, the electrolyte of the invention finds use as a component of an electrode as described below with reference to FIG. 3.

Figure 3:
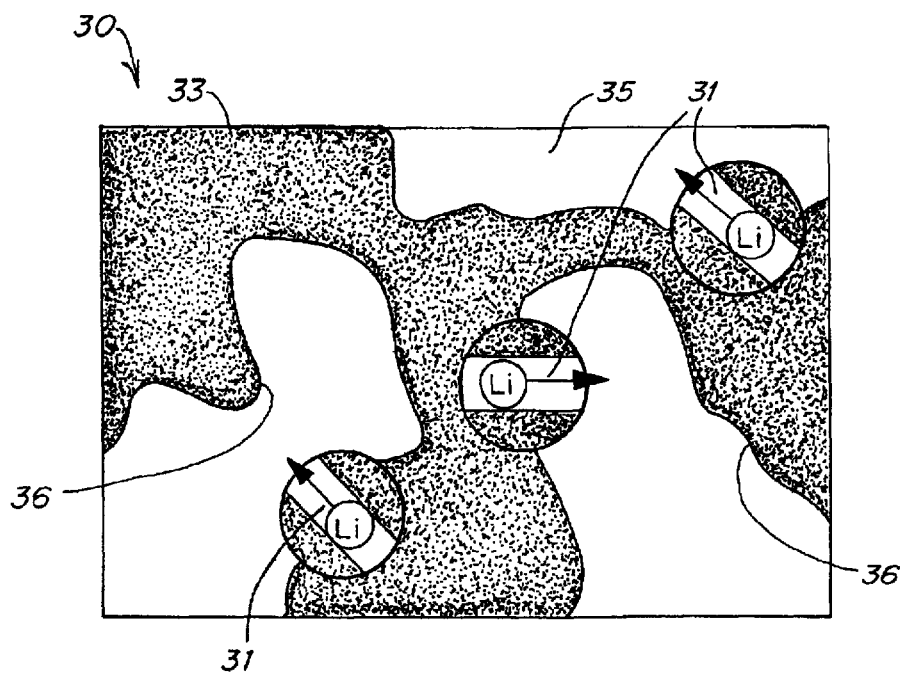
FIG. 3 illustrates schematically a portion of an interpenetrating microstructure including the polymer electrolyte of the invention and an immiscible, electronically conductive polymer, with particles pinned at interface boundaries between the polymer electrolyte and electronically conductive polymer.

Referring now to FIG. 3, another aspect of the invention is illustrated schematically. The arrangement of FIG. 3 can serve as an electrode in a solid battery, and can include as one component the electrolyte described immediately above. FIG. 3 illustrates the arrangement in general, as it can be applied to any arrangement of any combination of species that meet certain criteria, so as to clarify the physical parameters involved. Arrangement 30 of FIG. 3 includes particulate material 31 positioned at interface (interphase) boundaries 36 of a bicontinuous, interpenetrating microstructure (component dimension typically less than about 100 microns) formed of a first component 33 and a second component 35 phase-separated from component 33. Components 33 and 35 are immiscible, that is, the two species are mutually repulsive to the extent that they are not miscible. For example, polar species typically are immiscible with non-polar species and will coexist in an immiscible admixture including interphase boundaries between the two species. Oil-in-water emulsions and water-in-oil emulsions are examples of mixtures of immiscible species. Components 33 and 35 differ in chemical functionality (generally differing with respect to polarity) to the extent that they coexist as interpenetrating polymer phases that meet at interphase boundaries 36. "Interpenetrating" is meant herein to define an arrangement in which portions of different phases co-mingle to create a structure in which separate portions of each phase have cross-sectional dimensions on the micron scale. The length scale of FIG. 3, which is representative, is on the order of 1 micron. Separate portions of components 33 and 35 have cross-sectional dimensions, according to this arrangement, of from about 0.05 micron to about 200 microns. More typically, the interpenetrating structure will include portions having cross-sectional dimensions of from about 0.1 micron to about 100 microns.

Positioned between component phases 33 and 35 are particles 31. Particles 31 are made to segregate at interphase boundaries 36 by tailoring the interfacial tensions of the three species 33, 35, and 31. That is, when the interfacial tensions are selected appropriately, the selection of component 33 in conjunction with component 35 can be made on the basis of immiscibility (incompatibility), which can be predicted by referring to solubility parameters that are readily available, or otherwise by performing simple experiments. The two components should be selected so as to be able to form an interpenetrating structure induced by spinodal decomposition resulting from quenching of a melt or evaporation of a solvent from a solution of the two components. That is, above a certain temperature the two polymers should be miscible, and should thermodynamically favor phase separation to a bicontinuous interpenetrating structure upon lowering the temperature to a point below the spinodal temperature. Alternatively, the two components should be soluble in a solvent that, when evaporated, induces phase separation to form a bicontinuous interpenetrating structure. In either case, the bicontinuous interpenetrating structure should be most favored energetically, resulting in the bicontinuous interpenetrating structure as illustrated, with particulate material at interphase boundaries 36. This self-organization will occur when the following conditions (equation 4) are approximately met:

$$\gamma_{AB} > 2\gamma_{BC} - 2\gamma_{AC} \quad (4)$$

where $\gamma_{ij}$ represents interfacial tension between species i and j, A and B represent the immiscible interpenetrating component, C represents the particulate material, and $\gamma_{BC}$ is greater than $\gamma_{AC}$. The arrangement is very robust owing to the fact that the particulate material 31 will not lose contact with either component 33 or 35.

A simple screening test to determine whether a set of species meets these criteria is to dissolve species A and B in a solvent in which C is suspended or dissolved, place the solution/suspension on a glass slide, and allow the solvent to evaporate, optionally with the aid of applied heat, and to observe the resultant solid microscopically. Alternatively, a melt of the above can be cooled and solidified and then observed microscopically.

In a preferred embodiment the two interpenetrating phases are polymers. A required condition for phase separation of two polymer phases by a spinodal decomposition mechanism is:

$$2\chi_{AB} > 1/N_A \phi + 1/N_B(1-\phi) \quad (5)$$

where $\chi_{AB}$ is the well-known, temperature-dependent Flory interaction parameter that quantifies the repulsion between A and B components, $N_i$ is the average number of segments per chain of component i, and $\phi$ is the volume fraction of the A component in a blend of the two polymers. Equation 5 defines the instability threshold of the polymer blend. At temperatures where this equation is satisfied, the system will break spontaneously into two phases forming an interpenetrating, bicontinuous structure for systems with sizable fractions of both components. The interaction parameter can be estimated from:

$$\chi_{AB} = v(\delta_A - \delta_B)^2/kT \quad (6)$$

where $\delta_i$ is the Hildebrand solubility parameter of component i, v is the average segmental volume, k is the Boltzmann constant and T is the temperature in degrees Kelvin. The solubility parameters of numerous polymers are available in standard tables, can be calculated by group contribution methods or can be obtained by performing a series of solubility tests in various solvents with known solubility parameters. Alternatively, the miscibility of two polymers can be tested by casting a film of the two polymers from a mutual solvent, and subjecting the film to microscopic inspection or thermal analysis. Specifically, if a glass or melt transition specific to one of the components is detected by differential scanning calorimetry or differential thermal analysis, the blend is likely to be phase separated.

In a preferred embodiment, particles are arranged at interphase boundaries between two polymer phases where all components satisfy the interfacial tension criteria of equation 4. Interfacial tension between A and B polymer phases is related to the interaction parameter through:

$$\gamma_{AB} = (\chi_{AB}/6)^{1/2} \cdot \frac{b}{v} kT \quad (7)$$

where b is the average segment length. The interfacial tension between any two components can alternatively be determined directly from contact angle measurements (e.g., by measuring the contact angle of a molten polymer component on the particulate material) if the surface tensions of each component are known. Surface tension data can be obtained from the literature or calculated from multiple contact angle measurements using different liquids of known surface tension.

The arrangement of FIG. 3 in which particles 31 are positioned at interphase boundaries 36 finds particularly advantageous application as an electrode in a battery in accordance with the invention, in particular a solid polymer electrolyte battery. In the arrangement, the different components 33 and 35 are defined by an electronically-conductive polymer and an electrolyte 34 (such as the electrolyte of the invention), respectively, and particles 31 are defined by ion host particles (such as those of the invention). This arrangement is particularly robust in that the ion host particles cannot lose contact with either the electronically-conductive polymer or the electrolyte, hence failure by loss of electrical contact with the lithium host particles is prevented.

Figure 4:
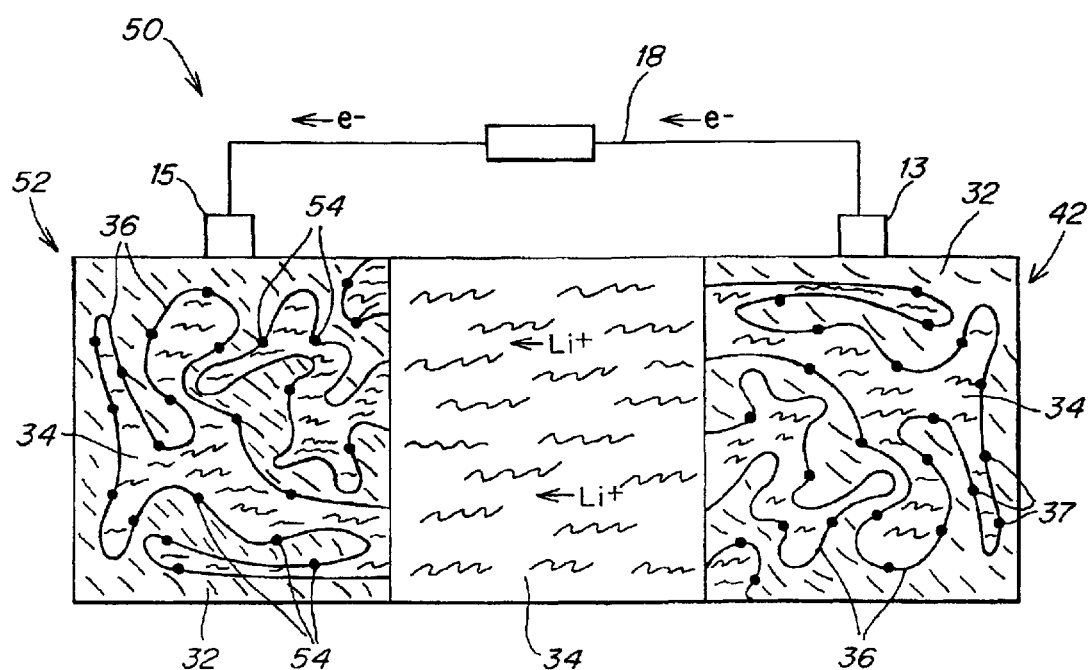
FIG. 4 illustrates schematically a lithium solid polymer electrolyte battery in accordance with the invention including a cathode and an anode each composed of an interpenetrating polymeric microstructure as illustrated in FIG. 3 including the polymer electrolyte of the invention, with lithium intercalation compounds positioned at interface boundaries, the anode and cathode connected by the polymer electrolyte of the invention.

An arrangement of one such embodiment of the invention is shown in FIG. 4, in which a lithium solid polymer electrolyte battery assembly 50 is illustrated schematically and includes an anode 52, cathode 42, and an external circuit 18 including terminals 13 and 15 as in the arrangement 10 of FIG. 1. Each of anode 52 and cathode 42 of battery 50 provided in accordance with this aspect of the invention is defined by a bicontinuous, interpenetrating polymeric structure of polymers immiscible at typical battery service temperatures, with particles positioned at polymer interphase boundaries as discussed with reference to FIG. 3. Each of the electrodes includes, specifically, a bicontinuous, interpenetrating structure of an electronically-conductive polymer 32 and block copolymeric electrolyte 34, with ion host particles 37 (cathode 42) and particles 54 (anode 52) positioned at interphase boundaries 36 of the interpenetrating structure. Block copolymeric electrolyte 34 also is in contact with and provides ionic communication between anode 52 and cathode 42.

As used herein, the term "bicontinuous" used in connection with an interpenetrating polymer structure including ion host particles positioned at polymer interphase boundaries, means at least two polymeric species that interpenetrate and in which a continuous conductive pathway, within each polymeric species, can be followed from any one ion host particle to at least two other ion host particles or to at least one ion host particle and a terminal or polymer electrolyte 34. That is, an arrangement exists in which most or all of the ion host particles are in electronic communication with a terminal of external circuit 18 via electronically-conductive polymer 32 and in ionic communication with polymer electrolyte 34. Interpenetrating polymeric structures of the invention are to be distinguished from interpenetrating polymeric networks described in common literature that are interpenetrating on the molecular scale. In a particularly preferred embodiment, the bicontinuous, interpenetrating structure self-organizes such that a continuous conductive pathway can be followed from any one ion host particle via electronically-conductive polymer 32, to a terminal and via electrolyte 34 of the interpenetrating structure to polymer electrolyte 34 of the region separating the anode 52 from the cathode 42.

Electrolyte 34 in this arrangement (including polymers that can be made ionically-conductive upon appropriate doping) and electronically-conductive polymer 32 (including polymers that can be made electronically-conductive upon appropriate doping) should be selected to form a bicontinuous interpenetrating structure, with lithium host particles 37 positioned at interphase boundaries, as discussed above with reference to the arrangement of FIG. 2. Additionally, the ionically-conductive polymer should be amorphous and non-glassy at typical battery service temperatures.

The electronically-conductive polymer of the invention should be selected to meet the above criteria among those that are known, for example, polyacetylene, poly(1,4-phenylenevinylene), polyaniline, sulphonated polyaniline, trans-polyacetylene, polypyrrole, polyisothianaphthalene, polyp-phenylene), poly(p-phenylenevinylene), polythiophene, and poly(3-alkyl-thiophene). In some cases, an appropriate surfactant might be used to improve the solubility of an electronically-conducting polymer in common organic solvents. For example, camphor sulfonic acid can be used to render polyaniline soluble in meta-cresol or $CH_3Cl$ (Y. Cao et al., Appl. Phys. Lett. 60, 2711 (1992)). In other cases, heat treatment may be required to convert a precursor polymer into the conjugated polymer after processing the blend into a bicontinuous microstructure. For example, films of poly(p-phenylene vinylene) can be prepared by solution casting of a polymer precursor followed by heating to above 200° C. whereupon the polymer is converted to its conducting form. In some cases, doping of the polymer by an appropriate agent may be required to achieve sufficient levels of electronic conductivity.

All that is required for battery 50 to be operative is that the chemical potential of lithium is low at the cathode as compared with the anode. Therefore, selection of different lithium host particles for the cathode and anode would suit the necessary criteria. Lithium host particles 37 and 54 can be any lithium host particle, including lithium intercalation compounds as described herein, when overall withdrawal of lithium ions and electrons from lithium host particle 37 and insertion of lithium ions and electrons into lithium host particles 54 is energetically uphill. When the opposite is the case, that is, when withdrawal of lithium and electrons from particles 37 and insertion of lithium and electrons into particles 54 is energetically downhill, the battery is operative with electrode 42 defining the anode and electrode 52 defining the cathode.

In other aspects of the invention, only cathode 42 or anode 52, respectively, is an electrode of the invention as illustrated in FIGS. 3 and 4, and the other electrode is conventional.

It is to be understood that block copolymeric electrolyte 34 can be used with any battery, including a typical prior art arrangement as illustrated in FIG. 1, the arrangement of FIG. 3, or other battery. For example, a battery including a cathode 42 as illustrated in FIG. 4, and a standard anode composed of lithium metal is embraced by the invention, as well as any other arrangement in which block copolymeric electrolyte 34 is useful in transporting ions. The particular ionic species used for ion conduction is not important to the embodiment embraced by the electrode structure of the invention. For example, alkali metal ions such as $Na^+$ and $K^+$ would be suitable as ionic species, also alkaline earth metals such as $Ca^{++}$ and $Mg^{++}$. Preferred for all embodiments is a lithium-doped polymer.

Ion host particles for use with an electrode of the invention can be selected from among many species. "Ion host particle" as used herein is meant to define a material that can reversibly accept an ion. A particle of material that participates in an ion metathetical reaction is suitable, for example $Ag_2WO_3$. In this arrangement, lithium can displace silver reversibly according to equation 8.

$$2Li+Ag_2WO_3 \leftrightarrow Li_2WO_3+2Ag \qquad (8)$$

Ion intercalation compounds also are suitable and, in preferred embodiments, a lithium intercalation compound such as $LiCoO_2$ is used. In another set of embodiments, an ion intercalation compound such as a metal dichalcogenide compound or compounds having a substantial amount of oxygen p-band characteristic at the Fermi energy level, as described below, and other embodiments of the invention involving improved ion host particles, can be used.

One advantage of the battery arrangement of the invention as illustrated in FIG. 4 (or any arrangement in which at least one anode includes the described and illustrated microstructure) is that, due to the inherent connectivity of the self-organized microstructure, it is possible to use smaller ion host particles than those used in conventional cathode designs. In particular, particles of size on the order of less than 80 microns, and preferably particles in the nanometer size range can be used. The use of finer particles, that is, those of smaller maximum cross-sectional dimensions, minimizes the detrimental effects of volume change occurring naturally during charging and discharging of the battery, and enhances overall lithium ion transport rate. From the perspective of current-carrying capacity, an ion needs to diffuse a shorter distance within a smaller particle. That is, as the ratio of surface area to volume is minimized (with small particles) the amount of diffusion of lithium within each particle is minimized. Small particles are better able to withstand size changes upon intercalation and de-intercalation, reducing the potential of the particles to crack and/or to lose contact with electronically-or ionically-conductive materials. One embodiment of the invention provides, therefore, ion host particles, preferably lithium host particles, less than about 80 microns in maximum cross-sectional dimension, preferably less than about 20 microns, more preferably less than about 1 micron, more preferably less than about 500 nm, more preferably less than about 100 nm, and more preferably still less than about 10 nm.

The present invention also provides a series of ion host particles, preferably lithium dichalcogenide compounds that are prepared for use in lithium intercalation reactions, particularly lithium metal or main group dioxides. These compounds are prepared based upon their predicted utility for intercalation as calculated using computer modeling techniques. Surprisingly, this approach has demonstrated that, in sharp contrast to the aforementioned conventional belief, during intercalation of a lithium ion into a metal or main group dioxide, the electron density may be transferred to electron bands which have states with a significant portion of charge density on the oxygen atoms.

Methods of the invention used to model intercalation reactions by computer include first principles methods of solving the Schrodinger equation. Such methods include, but are not limited to, the pseudo potential technique, the LMTO technique, the FLAPW technique and the Hartree-Fock technique. Other such first principles methods are known to those skilled in the art and are intended to be within the scope of the present invention.

Using these methods, the invention involves the discovery that, for lithium intercalation compounds with optimal formation energies, a significant amount of electron density is transferred to the oxygen atom p-level energy states of these compounds. In particular, as the amount of electron density transferred to the p-level energy states of the oxygen atoms increases monotonically, the formation energy of the lithium intercalation compound also increases monotonically.

In one embodiment, the amount of electron density transferred to the p-level energy states associated with the oxygen atoms was calculated using the pseudo potential method, such as described in: *Computer Physics Reports* 9,115 (1989); *Rep. Prog. Phys.* 51, 105 (1988); *Rev. Mod Phys.* 64, 1045 (1992); and/or *Phys. Rev.* B23, 5048 (1981). In this embodiment, the charge densities of the $MO_2$ and $LiMO_2$ compounds were calculated assuming these compounds had the same geometry. The difference in the charge densities of these two compounds were then calculated point-by-point on a grid of 40×40×40 points per unit cell. This difference was then integrated in a sphere of radius about 1.15 Å centered on an oxygen atom. This method provides the electron density transferred to a single oxygen atom during intercalation compound synthesis. Thus, since there are two oxygen atoms per intercalation compound, to calculate the total amount of electron density transferred to the p-level energy states of the oxygen atoms of the intercalation compound, this number is doubled.

Table I shows the fraction of electron charge transferred to each oxygen atom during intercalation compound synthesis as calculated using this pseudo potential approach, assuming both the $MO_2$ and $LiMO_2$ compounds were in the $\alpha$-$NaFeO_2$ crystal structure. The electron charge transfer values are calculated with the optimized pseudopotential method as described in Payne, M. C., M. P. Teter, et al. (1992). "Iterative Minimization Techniques for Ab-Initio Total Energy Calculations: Molecular Dynamics and Conjugate Gradients." *Rev. Mod. Phys.* 64: 1045. The formation energies are calculated with the soft pseudopotential technique as described by Kresse G. and J. Furthmüiller (1996). *Comput Mat Sci*, 6: 15. Kresse, G. And J. Hafner (1993); *Phys Rev B*, 47: 558. Kresse, G. and J. Hafner (1994); *Phys Rev B*, 49: 14, 251 and as implemented in the Vienna ab-initio Simulation Package (VASP) version 3.2. This table demonstrates that, as the amount of charge transferred to the oxygen atoms of the intercalation compound increases, the formation energy of the intercalation compound also increases.

TABLE I

| intercalation compound | $LiTiO_2$ | $LiVO_2$ | $LiCoO_2$ | $LiZnO_2$ | $LiAlO_2$ |
|---|---|---|---|---|---|
| fraction of electron charge transferred to each O atom | 0.21 | 0.24 | 0.25 | 0.27 | 0.32 |
| formation energy of intercalation compound (eV) | 2.36 | 3.05 | 3.73 | 4.79 | 5.37 |

Accordingly, in one embodiment the invention provides lithium intercalation compounds having at least about 20% of the electron density transferred to each oxygen atom during lithium intercalation compound synthesis as defined by the above-noted pseudo potential technique, more preferably at least about 25% and most preferably at least about 30%.

While an emphasis has been placed herein on the calculation of appropriate dioxides for use as lithium intercalation compounds, it is to be appreciated that the present invention is not limited to such methods or compounds. For example, the methods of the present invention may be readily used to calculate formation energies for other dichalcogenide compounds that may be used in lithium intercalation. In this regard, the formation energies for $LiCoO_2$, $LiCoS_2$ and $LiCoSe_2$ have been calculated as 3.97 eV, 2.36 eV and 1.68 eV, respectively. As known to those skilled in the art, for such calculations, the energies and other appropriate parameters associated with the atomic species in these other chalcogenide systems should be substituted for those of oxygen.

Furthermore, the intercalation compounds of the present invention may be used with ions other than lithium ions. For example, alkali atoms and ions other than lithium may be used. Other such molecules, atoms and ions are known to those skilled in the art and are intended to be within the scope of the present invention.

While shown in Table I as being fully intercalated, lithium intercalation compounds in accordance with the present invention need not be fully intercalated. Instead, lithium intercalation compounds may be represented by the empirical formula $Li_xM_yN_zO_2$. In this formula, M and N represent metal atoms or main group elements. x, y and z may each have any value between 0 and about 1, but y and z should be selected such that the formal charge on the $M_yN_z$ portion of the compound is (4−x). x is between 0 and 1.

Metals and main group elements appropriate for use as M or N include, but are not limited to, the 3d series of transition metals (i.e., Sc, Ti, V, Cr, Fe, Co, Ni, Cu and Zn), Cd, Al and B. Preferably one of M or N are Zn or Al. Other metals or main group elements may also be used as M or N, but some of these atoms may have particular disadvantages. For example, certain metals or main group elements may result in lithium intercalation compounds that are relatively heavy or expensive. Moreover, some metals or main group elements are comparatively rare or difficult to process.

In certain embodiments, the lithium intercalation compounds of the present invention are mixed metal or main group element compounds (i.e., y and z are each greater than zero) since these compounds can offer good formation energies while allowing other desirable features to be tailored to a particular purpose. For example, under certain circumstances, it may be desirable to prepare $Li_xZnO_2$ or $Li_xAlO_2$ with the crystal structure of $Li_xCoO_2$ (i.e., the $\alpha$-$NaFeO_2$ crystal structure). However, it may be difficult to prepare $Li_xZnO_2$ or $Li_xAlO_2$ in this structure. Therefore, a $Li_xZn_yCo_zO_2$ or $Li_xAl_yCo_zO_2$ compound may be prepared that has the crystal structure of $Li_xCoO_2$ and a formation energy close to that predicted for $Li_xZnO_2$ or $Li_xAlO_2$ in this structure.

In another example, while $LiAlO_2$ is predicted to have a very high energy density, it may be difficult to prepare in the $\alpha$-$NaFeO_2$ structure or may have low electronic conductivity. Therefore a mixed-metal $Li_x(M_yAl_z)O_2$ compound may be prepared that still has high energy density but with better electronic conductivity and that can be made in a crystal structure that allows for lithium (de-)intercalation. Table II shows the predicted formation energies for $Li_x(M_yAl_z)O_2$ compounds with M=Ti, V, Mn, Fe, and Co and y equal to ⅓ and ⅔ while z is equal to ⅔ and ⅓. The energies are calculated with the VASP 3.2 program. This table demonstrates that a significant formation energy increase is retained for Al even when mixed with other metals.

TABLE II

| Metal | Li(M⅔Al⅓)O₂ | Li(M⅓Al⅔)O₂ |
|---|---|---|
| Ti | 4.06 | 3.13 |
| V | 3.58 | 2.97 |
| Mn | 4.02 | 3.67 |
| Fe | 4.35 | 3.88 |
| Co | 4.66 | 4.20 |

In other embodiments, it may be advantageous to prepare lithium intercalation compounds from only one metal or main group element to reduce the cost and/or time associated with preparation of these compounds. For these embodiments, z should be 0 such that the empirical formula of the lithium metal or main group element dioxide is $Li_xMO_2$.

In one particular set of embodiments, the invention reflects the discovery that addition of Al, in a homogeneous manner, into a lithium oxide compound can result in a high-energy compound, in particular a compound having a raised voltage relative to the lithium oxide without aluminum. The invention involves substitution of Al for M, to some extent, in the compound $LiMO_2$, where M is a metal as described herein. This aspect of the invention is a significant departure from the teachings of the prior art, as a whole, which do not involve recognition of any possibility of increasing the voltage of a lithium intercalation compound by incorporation of Al. The compound of the present invention is homogeneous, rather than being phase separated, and as a result exhibits advantageous electrical properties. Formation of a homogeneous compound is achieved by generally lower-temperature synthesis techniques that retain a higher-energy state in the compound. General prior art synthetic techniques for mixed-metal compounds of this type typically result in phase separation to a low-energy state. The incorporation of Al into compounds of this type, and the discovery of a technique for incorporation resulting in a high-voltage compound, is a significant advantage since Al is very light weight and inexpensive relative to most other metals that would be candidates for use in such compounds. Indeed, even if an increase in voltage in the compounds of this aspect of the invention had not been realized, but voltage had remained essentially identical, a significant advantage would have been realized due to the relatively low expense of Al. An additional benefit is the low toxicity of Al.

In another set of embodiments, the invention reflects the discovery that addition of Al to form an intercalation compound $LiAl_yM_{1-y}O_2$ allows the stabilization of the α-NaFeO₂ structure type for a compound which as pure $LiMO_2$ is not easily formed in this structure. Here M can be but is not limited to Mn, Fe, and Ti. For instance, $LiMnO_2$ can be crystallized in the orthorhombic symmetry phase (T. Ohzuku, A. Ueda, T. Hirai, *Chemistry Express*, Vol. 7, No. 3, pp. 193–196, 1992) as a pure compound, or as the tetragonal spinel $Li_2Mn_2O_4$ by electrochemical or chemical insertion of Li into the spinel $LiMn_2O_4$, but has only been formed in the α-NaFeO₂ structure type (which in this composition has monoclinic symmetry, space group C2/m) by the ionic exchange of $Li^+$ for $Na^+$ in $NaMnO_2$ (A. R. Armstrong and P. G. Bruce, *Nature*, Vol. 381, p.499, 1996). As we show in Example 6, a solid solution $Li(Al, Mn)O_2$ can be readily crystallized in the monoclinic variant of the α-NaFeO₂ structure type by using a mixed hydroxide precursor and heating in a reducing gas environment.

Still another set of embodiments reflects the discovery that an intercalation compound $LiAl_yMn_{1-y}O_2$ which is crystallized in the α-NaFeO₂ structure type, forms upon electrochemical cycling an intercalation compound with two characteristic voltages of intercalation, a high energy density, and excellent cycling performance. In particular, this intercalation compound can be cycled over voltage and capacity ranges which include both a 4 V and 3 V plateau (against a Li metal anode), similar to that of Li—Mn—O spinels, but without the loss of capacity upon cycling that is characteristic of previous spinels. This allows practical utilization of both voltage regimes, and consequently results in a higher practical energy density.

Those of ordinary skill in the art also typically would not have expected to have achieved success by incorporating Al into compounds of this sort since Al is not a 3d metal, and is fixed in valence. In oxide systems, Al is a metal or $Al^{3+}$. Thus, those of ordinary skill would not have expected Al to be a useful participant in a system of this type which typically is thought to involve a reaction such as $M^{4+}+e^- \rightarrow M^{3+}$. However, the present invention involves the recognition that oxygen is electrochemically active in the compounds disclosed, thus the fixed-valence nature of Al is not problematic.

The compound $LiAl_yM_{1-y}O_2$ preferably includes Ti, V, Mn, Fe, Co, Ni, Cr, Co or Mn, and in a particularly preferred embodiment M=Co. In this formula, 0<y<0.75 in preferred embodiments, and in a particularly preferred embodiment 0.15<y<0.5. The compound has an α-NaFeO₂ structure, or a spinel structure.

Lithium intercalation compounds are commonly prepared by the physical mixing of powders of salts of each of the metals. For example, in order to prepare $LiCoO_2$, $Li_2CO_3$ or LiOH may be used as a source of Li, and CoO or $Co(NO_3)_2$ used as the source of Co. A mixture of such powders typically must be fired at temperatures of about 800° C. or higher in order to crystallize a well-ordered $LiCoO_2$. The extent of ordering can be determined by X-ray crystallography, and it is recognized in the art that the highly ordered, so-called "high temperature (HT)" $LiCoO_2$ has superior electrochemical properties compared to the so-called "low-temperature (LT)" $LiCoO_2$, as explained by R. J. Gummow et al., *Mat. Res. Bull.*, Vol. 28, pp. 1177–1184 (1983), and Garcia et al., *J. Electrochem Soc.*, Vol. 144, pp. 1179–1184(1997).

While the nominal compositions of the present invention may also be prepared by such methods, the increased formation energy of the subject compounds may not be realized in such a preparation due to a lack of sufficient homogeneity. For example, Ohzuku et al. have tested $LiAl_{1/4}Co_{3/4}O_2$ prepared by mixing together $LiNO_3$, $NiCO_3$, and $Al(OH)_3$ and firing at 750° C. in oxygen for 20 h, and report no increase in voltage compared to $LiCoO_2$. Thus they teach against the present invention. As another example, Nazri et al. have tested $LiAl_yCo_{1-y}O_2$ and $LiAl_yNi_{1-y}O_2$ prepared by mixing powders of LiOH and CoO, $Co_3O_4$, or NiO, and firing at 750° C. for a total of 45 h, and also show no increase in voltage compared to $LiCoO_2$ and $LiNiO_2$. They also teach against the present invention.

According to the present invention, a preferred method of preparing the subject compounds utilizes hydroxides of each of the metals in the compound. Hydroxides of the constituent metals firstly decompose to the oxides without melting, unlike most metal nitrate salts, secondly decompose typically at lower temperatures upon firing than do other metal salts such as carbonates or sulfates, and thirdly, yield primarily water vapor as a decomposition product, rather than undesirable or toxic gases. For the compounds $LiCoO_2$ and $LiNiO_2$, or solid solutions containing Co or Ni, the use of the hydroxides $Co(OH)_2$, CoOOH, $Ni(OH)_2$ or NiOOH has a particular advantage. These hydroxides are structurally closely related to the desired $\alpha$-$NaFeO_2$ structure. $Co(OH)_2$ and $Ni(OH)_2$ tend to form CoOOH and NiOOH upon decomposition, and the latter are nearly identical in structure to $LiCoO_2$ and $LiNiO_2$, differing primarily in the substitution of $Li^+$ and $H^+$ within the structure. Furthermore, $Li^+$ and $H^+$ both have high diffusion coefficients in these structures, and can be readily exchanged for one another. Thus by using hydroxide precursors, it is possible to obtain the ordered "HT" structure of these compounds at markedly reduced firing temperatures compared to conventional preparation.

In another, particularly preferred synthesis technique, a still greater level of homogeneity is achieved in a precipitation/freeze-drying process. The hydroxides of the metals M and N are first simultaneously precipitated from an aqueous solution containing water-soluble salts of these metals, such as an aqueous nitrate solution. This can be accomplished by determining a relatively narrow pH range within which hydroxides of M and N are simultaneously insoluble. The hydroxide or mixed hydroxides are then separated from the solution in which they were precipitated, for example by filtering or centrifugation, so that the origin salts are not reformed upon firing. As all of the well-known Li salts are soluble in water, Li is not easily co-precipitated with the M,N hydroxides. In order to obtain a highly homogeneous mixture of Li, M, and N, the precipitated hydroxides or mixed hydroxides are then dispersed in an aqueous solution containing a water-soluble Li salt such as LiOH. This suspension of solid hydroxide particulates in the Li containing solution is then dried so as to prevent compositional segregation. A preferred method of drying is freeze-drying, wherein the suspension is atomized or sprayed into liquid nitrogen, and then frozen droplets freeze-dried so as to achieve a microscopically homogeneous mixture of LiOH and the hydroxides of M and N. The dried hydroxide mixture is then heated in air or oxygen at temperatures of 200–800° C. to obtain the mixed oxide compound.

According to the present invention, lithium intercalation compounds preferably have a formation energy of at least about 3 eV, more preferably at least about 4 eV and most preferably at least about 4.5 eV as measured according to the above-described pseudo potential technique. The energy densities of lithium intercalation compounds of the present invention preferably are at least 100 W·hr/kg, preferably at least about 150 W·hr/kg, more preferably at least about 180 W·hr/kg.

Lithium intercalation compounds in accordance with the present invention should be electrical conductors. As used herein, the term "electrical conductor" refers to a compound having an electrical conductivity of at least about $1 \times 10^{-5}$ Siemen/cm as measured by the four-point DC technique or by AC impedance spectroscopy. However, some lithium intercalation compounds with formation energies within the above-noted ranges are electrical insulators. By "electrical insulator," it is herein meant to refer to a compound with an electrical conductivity of less than about $1 \times 10^{-5}$ Siemen/cm as measured by the four-point DC technique or by AC impedance spectroscopy. For example, $LiAlO_2$ has a formation energy of higher than 5 V, but this compound is an electrical insulator.

According to the present invention, electrically insulating, lithium intercalation compounds that have a formation energy within the above-noted ranges may be doped with atoms such that the resulting intercalation compound is electrically conductive and has a formation energy in accordance with the present invention. Dopants appropriate for use in the present invention include, but are not limited to, Ti, Mn, Fe and Cr. Methods of doping such lithium metal or main group element dioxide intercalation compounds include, for example, firing a mixture of the oxide, along with the dopant oxide and lithium oxide or lithium hydroxide under appropriate conditions of temperature and oxygen pressure.

The intercalation compounds of the present invention can be used as lithium intercalation compound 24 in a cathode for a rechargeable battery such as cathode 12 of battery 10 as depicted in FIG. 1 which includes electrically conductive particles 28 (formed, for example, from a substance such as carbon black), ionically conductive material 26 (for example, doped polyethylene oxide). Ion host particles of the invention also can be used in an electrode of the invention as illustrated in FIGS. 3 and 4. In an arrangement such as that of FIG. 4 in which cathode 42 and anode 52 are each formed from interpenetrating polymer microstructures, the formation energy of the ion host particles of the anode should be less than that of the ion host particles of the cathode.

For battery 10 to function effectively, there must be electronic communication between lithium intercalation compound particles 24 and terminal 13 of cathode 12 and ionic communication between lithium intercalation compound particles 24 and polymer electrolyte 16. This requires good contact between components 24, 26 and 28. That is, for electrons to flow from each lithium intercalation compound particle 24 to terminal 13, a well-connected network of electronically-conductive particles 28 (and lithium intercalation compound particles where they are electronically-conductive) must exist between each intercalation compound particle and terminal 13, and a well-connected pathway of ionically-conductive material 26 (and lithium intercalation compound particles where they are ionically-conductive) must exist between lithium intercalation compound particles 24 and the polymer electrolyte 16. One significant problem with prior art cathode designs is that repeated charge/discharge cycling typically leads to increased electrical resistance across the cathode. The effect is thought to be due to passivation of the intercalation particle surface. This leads to a decrease in battery performance, for example, peak current falls.

Another problem of the arrangement of FIG. 1 is that, even assuming good electrical or ionic contact between adjacent components, the arrangement of cathode 12 does not guarantee that each lithium intercalation particle 24 will be in ionic communication with electrolyte 16 and in electronic communication with terminal 13. Since the arrangement of cathode 12 is simply a mixture of three different components, a lithium intercalation particle 24 can become either isolated electronically from terminal 13, or isolated ionically from polymer electrolyte 16, or both. For example, a lithium intercalation particle 25, as illustrated, is in ionic communication with polymer electrolyte 16 via an ionically-conductive material 26 contacting both particle 25 and electrolyte 16, but is not in electronic communication with terminal 13 since it is not in contact with any electronically-conductive material that is in electronic communication with terminal 13 or with another lithium intercalation particle that is in electronic communication with terminal 13. Accordingly, particle 25 is effectively isolated and can play no part in charging and discharging of battery 10. This leads to a loss of capacity in the battery.

According to a particularly preferred embodiment of the invention as illustrated in FIG. 4, ionically-conductive polymer 34 of cathode 42 and the solid polymer electrolyte of the battery are defined by the same material (although, as discussed above, any electrolyte can be used in the invention). Use of a solid polymer electrolyte, as opposed to a liquid electrolyte, offers many advantages, as is known. Use of the same material for ionically-conductive polymer 34 and the solid polymer electrolyte of the battery minimizes an energy barrier associated with ion transfer across the electrode/electrolyte interface.

Described above is a cathode suitable for use in a lithium solid polymer electrolyte battery. However, the invention provides an arrangement suitable for use as a cathode or anode, or both, in a solid battery. For example, a battery having a cathode as illustrated in FIG. 4, and an anode including a similar bicontinuous, interpenetrating polymer microstructure of an electronically-conductive polymer and an ionically-conductive polymer, with a different lithium host particle, could be used.

The function and advantage of these and other embodiments of the present invention will be more fully understood from the examples below. The following examples are intended to illustrate the benefits of the present invention, but do not exemplify the full scope of the invention.

EXAMPLE 1

Figure 5:
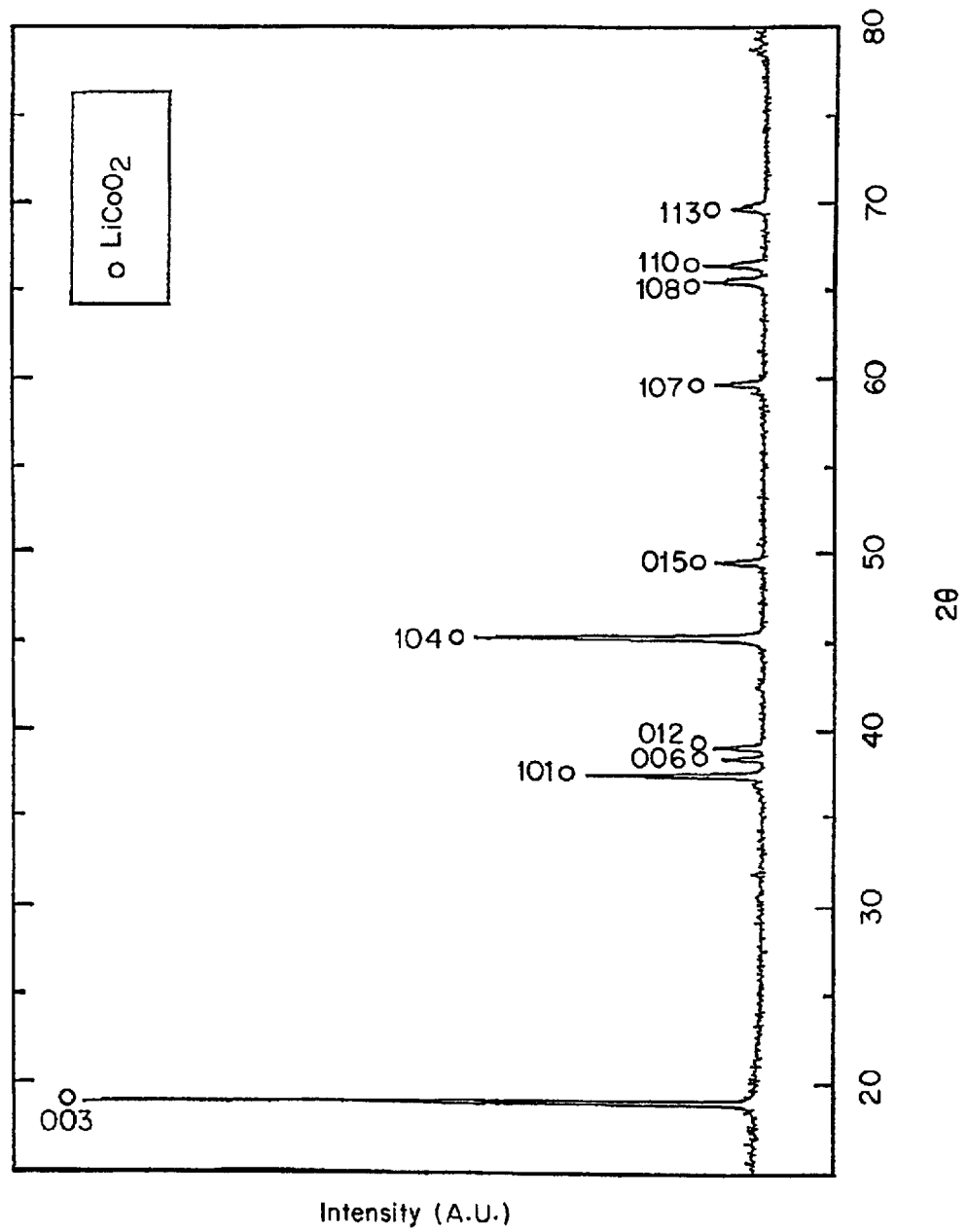
FIG. 5 is a powder X-ray diffraction pattern of $LiCoO_2$ forming the $\alpha$-$NaFeO_2$ structure, prepared by mixing $Co(OH)_2$ and $LiOH \cdot H_2O$ powders and heating to 600° C. in air for 8 hours.

Synthesis of $LiCoO_2$ from Mixed Hydroxides $LiCoO_2$ crystallized in the $\alpha$-$NaFeO_2$ structure was prepared. 23.70 g of $Co(OH)_2$ powder (formula weight 92.95, from Aldrich Chemical Company, Milwaukee, Wis.) and 11.23 g of $LiOH.H_2O$ powder (formula weight 41.96, from Aldrich Chemical Company), were mixed by ball-milling with aluminum oxide milling balls in a polypropylene jar at 120 rpm for 18 hours. The mixed hydroxide powders were heated to 600° C. in air in an alumina crucible and held for 8 hours, then cooled. Powder X-ray diffraction, FIG. 5, showed that the resulting powder had the highly-ordered $\alpha$-$NaFeO_2$ structure, indicated by the clear separation between the closely spaced diffraction peaks labeled (006)/(012) and (108)/(110).

EXAMPLE 2

Synthesis of $LiAl_{0.25}Co_{0.75}O_2$ from Mixed Hydroxides

The compound $LiAl_{0.25}Co_{0.75}O_2$, crystallized in the $\alpha$-$NaFeO_2$ structure, was prepared. 10.49 g of $LiOH.H_2O$ powder (formula weight 41.96, from Aldrich Chemical Company), 17.43 g of $Co(OH)_2$ powder (formula weight 92.95, from Aldrich Chemical Company, Milwaukee, Wis.) and 4.88 g of $Al(OH)_3$ (formula weight 78.00, from Aldrich Chemical Company, Milwaukee, Wis.) were mixed by ball-milling with aluminum oxide milling balls in a polypropylene jar at 120 rpm for 18 hours. The mixed hydroxide powders were heated to 850° C. in air in an alumina crucible and held for 3.5 hours, then cooled. Powder X-ray diffraction showed that the resulting powder had the highly-ordered $\alpha$-$NaFeO_2$ structure.

EXAMPLE 3

Figure 6:
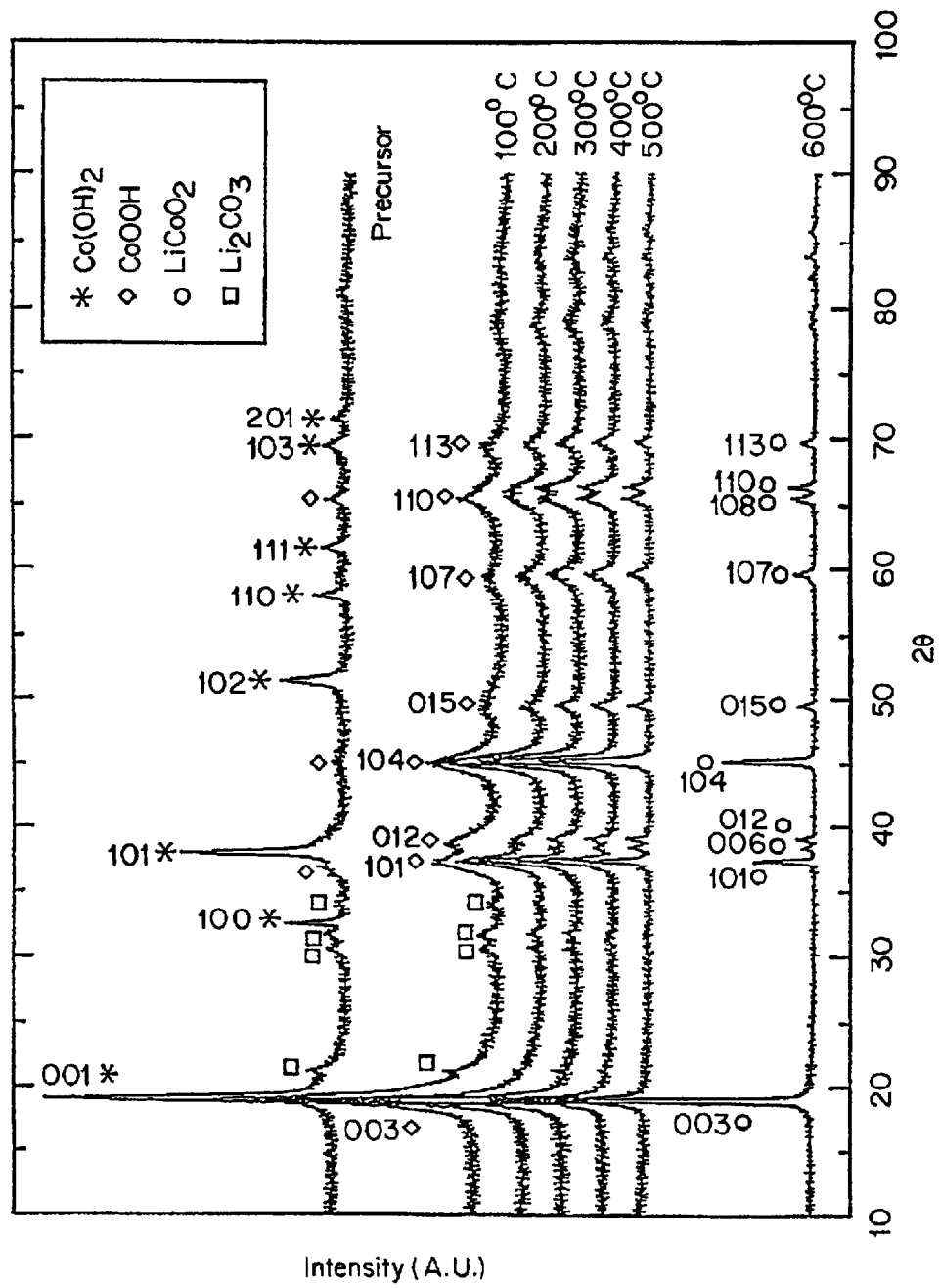
FIG. 6 shows powder X-ray diffraction patterns for a freeze-dried hydroxide precursor to $LiCoO_2$, after freeze-drying, and after heating in air for 2 hours at 100–500° C.

Synthesis of $LiCoO_2$ by Hydroxide Precipitation and Freeze-Drying $LiCoO_2$ of the "HT" structure, i.e., the $\alpha$-$NaFeO_2$ structure, was prepared. $Co(OH)_2$ was precipitated by adding 0.1 M solution of $Co(NO_3)_2$ (Alfa Aesar, Ward Hill, MA) in deionized water to a continuously stirred solution of $LiOH.H_2O$ in deionized water kept at pH=11, near the minimum solubility pH for $Co(OH)_2$. The precipitate was allowed to digest for 12 h, then settled by centrifugation. Nitrate ions, which otherwise re-form into low-melting nitrate compounds upon drying which can melt and cause compositional segregation upon subsequent firing, were removed in a rinsing procedure. The supernatant liquid from precipitation was decanted, and the $Co(OH)_2$ ultrasonically dispersed in a buffer solution of $LiOH.H_2O$ in deionized water at pH=11. The precipitate was settled by centrifugation, and the supernatant again decanted. This cycle of dispersion in a buffer solution, settling by centrifugation, and decanting was conducted a total of 5 times. The rinsed precipitate was dispersed a final time in an aqueous solution containing dissolved $LiOH.H_2O$ at a concentration which yielded an overall composition with a Li to Co ratio of approximately one. This suspension was then atomized into liquid nitrogen, and the frozen droplets freeze-dried (Consol 12LL, the Virtis Company, Gardiner, N.Y.), to obtain a uniform and fine dispersion of crystalline $Co(OH)_2$ and amorphous lithium hydroxide (partially hydrated). The freeze-dried precursor powder was then heated in air to temperatures from 100–850° C. for 2 hours. FIG. 6 shows X-ray diffraction (XRD) scans of the as-freeze-dried powder, and after firing in air for 2 hours at temperatures from 100–600° C. The precursor contains $Co(OH)_2$ as the predominant crystalline phase; the lithium hydroxide is amorphous to X-rays. Upon firing at 100° C. for 2 h, the strongest lines for $Co(OH)_2$ ((100), (101), and (102)) are already greatly diminished, whereas those for $LiCoO_2$ are appearing. With increasing firing temperature, the increasingly sharper lines indicate a well-crystallized product, in which the peak positions and relative intensities indicate "HT" $LiCoO_2$, of the $\alpha$-$NaFeO_2$ structure.

EXAMPLE 4

Figure 7:
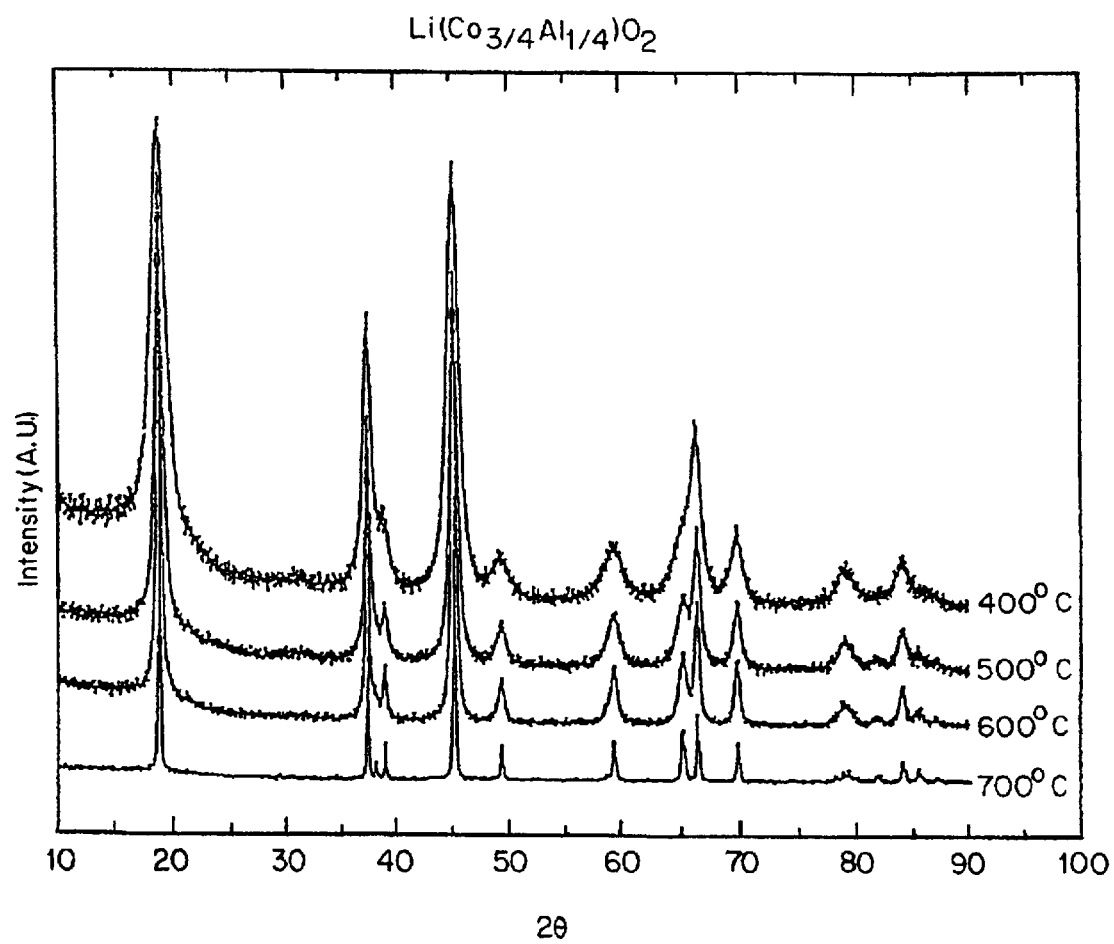
FIG. 7 shows powder X-ray diffraction patterns of a composition $Li(Al_{1/4}Co_{3/4})O_2$ prepared by co-precipitation and freeze-drying, and fired in air for 2 hours at temperatures 400° C. to 700° C., in each instance forming the $\alpha$-$NaFeO_2$ crystal structure.

Synthesis of $LiAl_yCo_{1-y}O_2$ by Hydroxide Precipitation and Freeze-Drying $LiAl_yCo_{1-y}O_2$ of compositions y=0.25, 0.50 and 0.75 were prepared. The compositions y=0.25 and 0.50 were crystallized in the $\alpha$-$NaFeO_2$ structure, while the composition y=0.75 showed a majority of the $\alpha$-$NaFeO_2$ structure and a minority crystallized in the tetragonal polymorph of $LiAlO_2$. Cobalt and aluminum hydroxide were simultaneously co-precipitated by preparing a 0.2 M solution containing $Co(NO_3)_2$ and $Al(NO_3)_3$ (Alfa Aesar, Ward Hill, Mass.) in the desired Al/Co molar ratio, dissolved in deionized water. The mixed hydroxide was precipitated by adding this solution to a continuously stirred solution of $LiOH.H_2O$ in deionized water kept at pH=10.5. The precipitate was allowed to digest for 12 h, then settled by centrifugation. The rinsing and settling procedure described in Example 3 was used in order to remove residual nitrate ions. The rinsed precipitate was dispersed a final time in an aqueous solution containing dissolved $LiOH.H_2O$ at a concentration which yielded an overall composition with a Li to Co+Al molar ratio of approximately one. This suspension was then atomized into liquid nitrogen, and the frozen droplets freeze-dried, then heated in air to temperatures from 400–850° C. for 2 hours. FIG. 7 shows X-ray diffraction scans for the $LiAl_{0.25}Co_{0.75}O_2$ powder after firing at temperatures from 400–700° C. With increasing temperature, the X-ray diffraction lines are increasingly sharper, and show a well-crystallized powder of the $\alpha$-$NaFeO_2$ structure, while the compound $LiAl_{0.75}Co_{0.25}O_2$ showed a minor amount of the tetragonal polymorph of $LiAlO_2$ after calcining for 2 hours in air at 200–700° C.

EXAMPLE 5

Electrochemical Testing

The compounds of Examples 1–4 were tested in a standard test cell configuration: Li metal/1.0 M $LiPF_6$ in (50%EC+50%DEC) oxide+carbon+PVDF. Approximately 30 mg of oxide powder were used in each cell. The cells were charged and discharged at constant current densities from 0.05 to 0.4 mA per $cm^2$ of electrode area.

Figure 8:
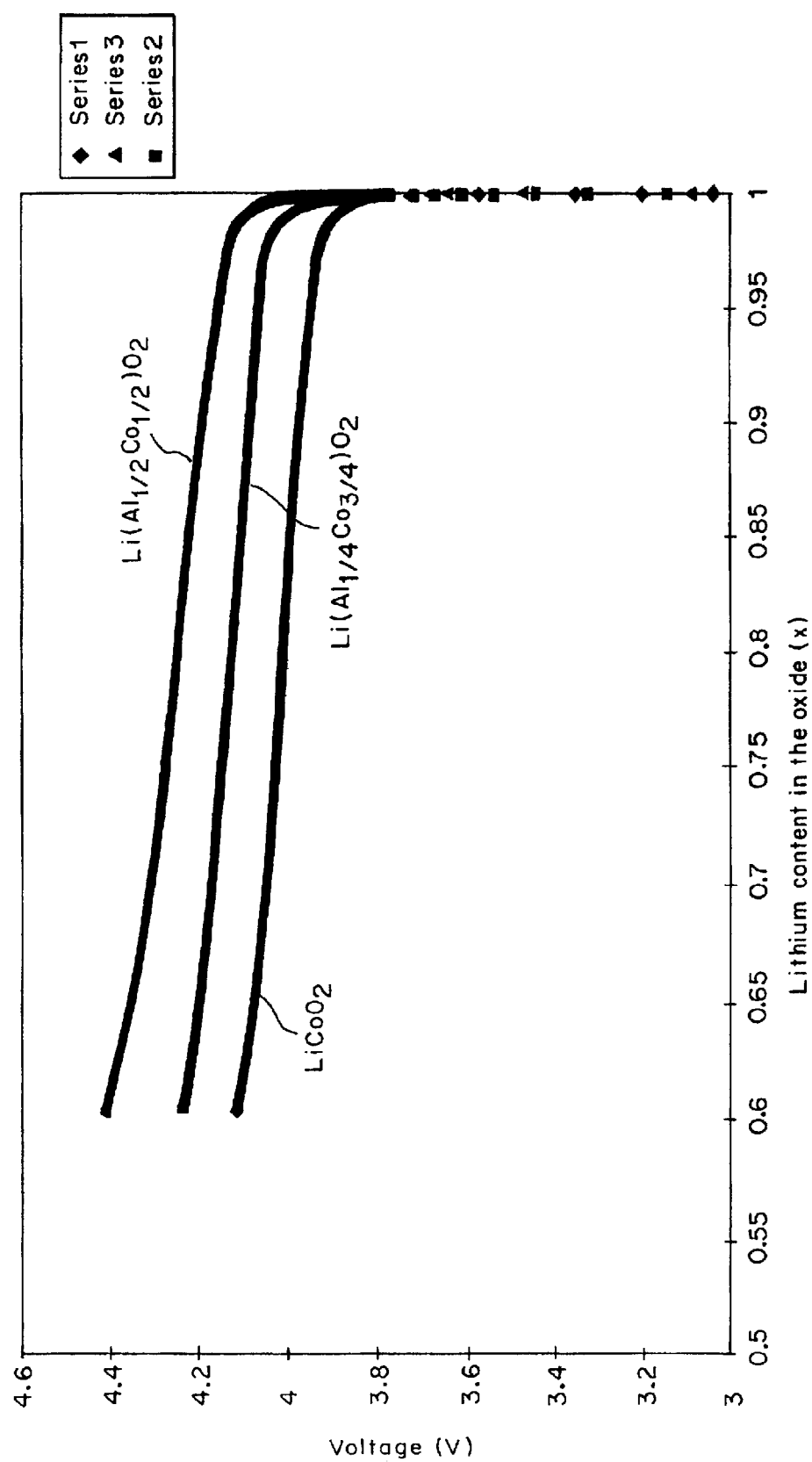
FIG. 8 shows charging curves for compositions $LiCoO_2$, $Li(Al_{1/4}Co_{3/4})O_2$, and $Li(Al_{1/2}Co_{1/2})O_2$ prepared according to Examples 3 and 4, and tested as a cathode material against a Li metal anode in a coin-type Li battery where the charging current is 0.2 mA per $cm^2$ of cathode area, and each composition was charged to a nominal composition of $Li_{0.6}Al_yCo_zO_2$.
Figure 9:
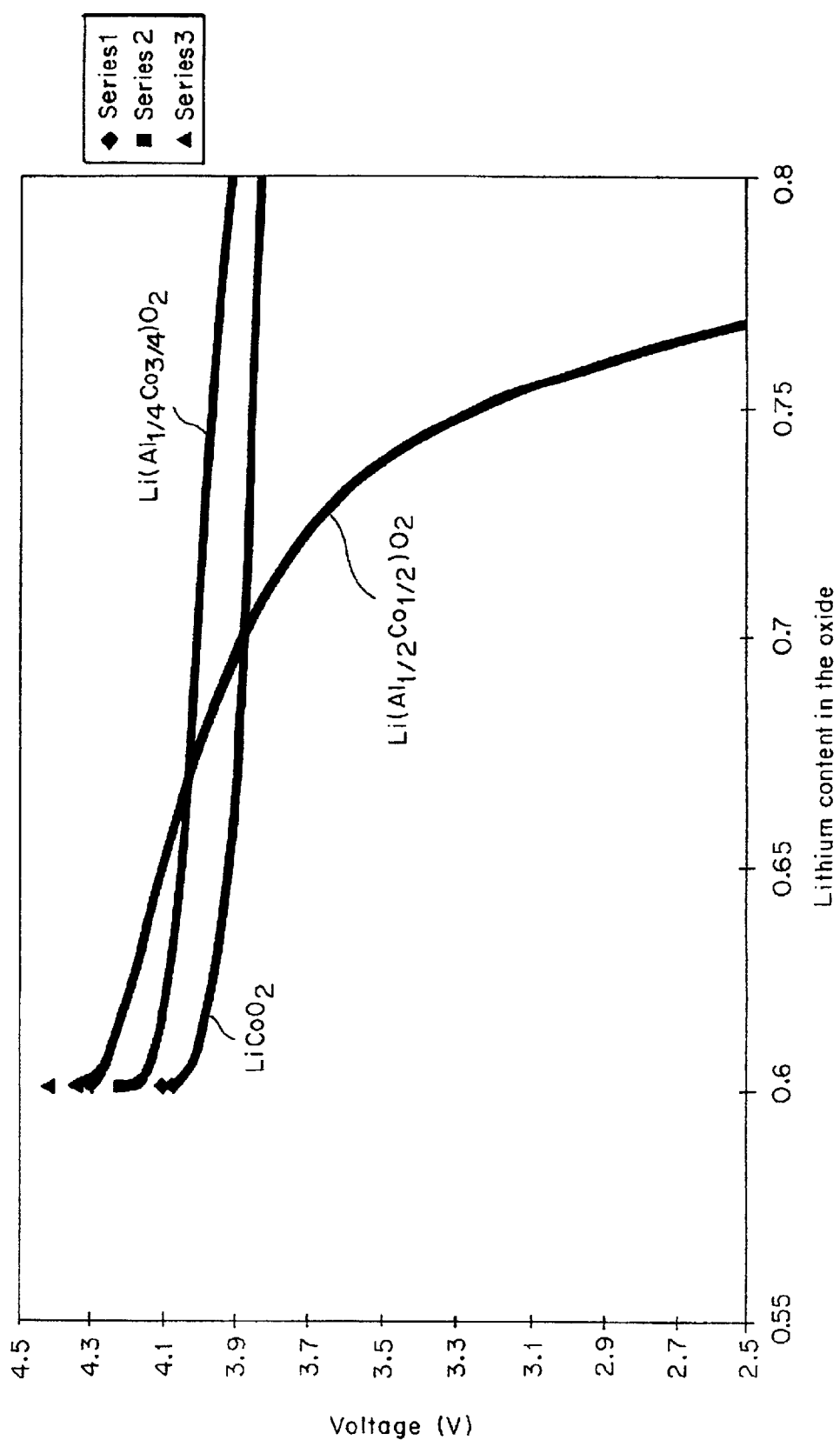
FIG. 9 shows discharging curves for compositions $LiCoO_2$, $Li(Al_{1/4}Co_{3/4})O_2$, and $Li(Al_{1/2}Co_{1/2})O_2$, prepared according to Examples 3 and 4, and tested as a cathode material against a Li metal anode in a coin-type Li battery, the discharging current being 0.2 mA per $cm^2$ of cathode area, and each composition was first charged to a nominal composition of $Li_{0.6}Al_yCo_zO_2$.

FIG. 8 shows charging curves for the compounds $LiCoO_2$, $Li(Al_{1/4}Co_{3/4})O_2$, and $Li(Al_{1/2}Co_{1/2})O_2$, prepared according to Examples 3 and 4. The charging current is 0.2 mA per $cm^2$ of cathode area, and each composition was charged to a nominal lithium concentration of $Li_{0.6}Al_yCo_zO_2$. The systematic increase in the voltage with Al concentration indicates that the Al addition has the predicted effect of increasing formation energy of the compound. FIG. 9 shows discharging curves 0.2 mA/$cm^2$ for the same samples after charging to a nominal composition of $Li_{0.6}Al_yCo_zO_2$. The initial discharge voltage is higher for both of the Al containing compositions than for $LiCoO_2$. The discharge voltage for $Li(Al_{1/4}Co_{3/4})O_2$ remains higher out to a discharged Li concentration beyond $Li_{0.8}Al_yCo_zO_2$.

Figure 10:
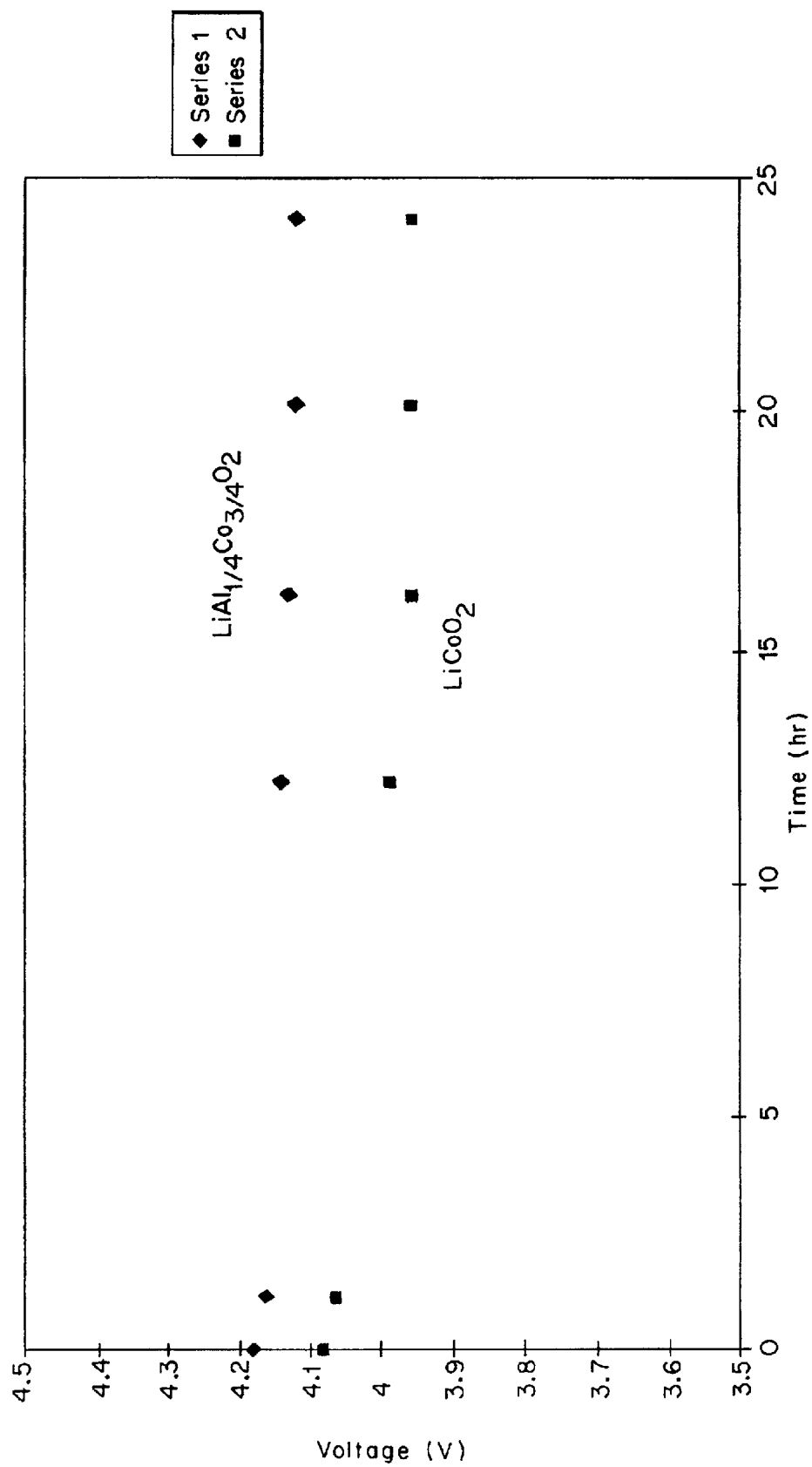
FIG. 10 shows the open-circuit voltage as a function of time for two coin cell type Li batteries, containing $LiCoO_2$ and $Li(Al_{1/4}Co_{3/4})O_2$, prepared according to Examples 3 and 4, as the cathode materials respectively and Li metal as the anode material, after first charging to a nominal composition of $Li_{0.6}Al_yCo_zO_2$ at a current density of 0.2 $mA/cm^2$.

FIG. 10 shows the open-circuit voltage as a function of time for two cells containing $LiCoO_2$ and $Li(Al_{1/4}Co_{3/4})O_2$ respectively, prepared according to Examples 3 and 4. The cells were charged to a nominal lithium concentration of $Li_{0.6}Al_yCo_zO_2$ at a current density of 0.2 mA/$cm^2$. Then the cells were disconnected from the charging current and the open circuit voltage measured over time. The voltage of the Al-containing compound remains higher throughout this measurement, to 24 hours. Further testing showed that the higher voltage is retained over several days. The result shows that the increase in voltage is a true equilibrium voltage.

Figure 11:
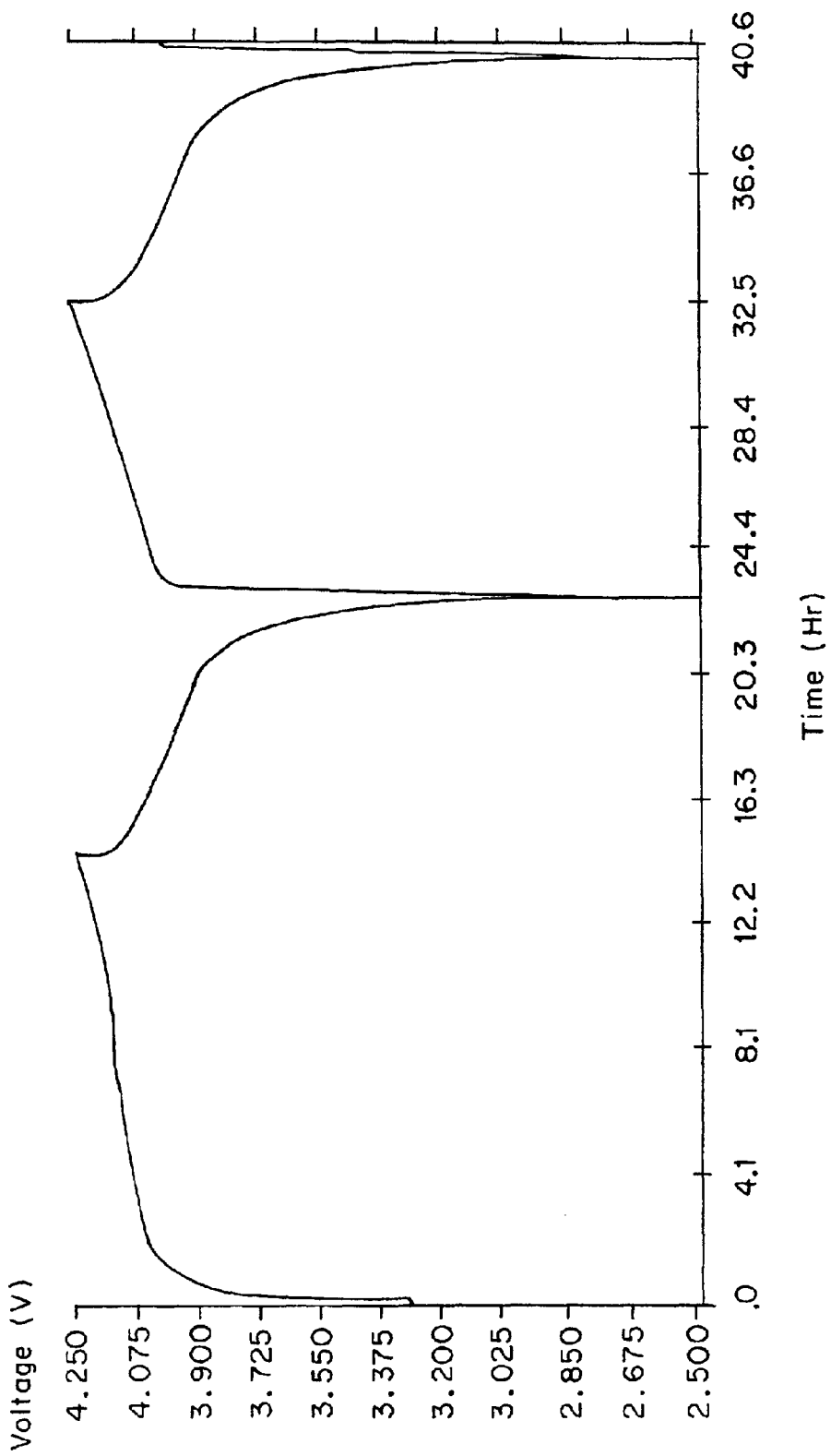
FIG. 11 shows charge-discharge curves over two cycles for a compound $(LiAl_{1/4}Co_{3/4})O_2$, prepared according to Example 2.

FIG. 11 shows charge-discharge curves over two cycles for a compound $Li(Al_{1/4}Co_{3/4})O_2$, prepared according to Example 2, and charged/discharged at 0.4 mA/$cm^2$. Here, as in FIGS. 8–10, the charge and discharge voltages are respectively higher than those for $LiCoO_2$.

EXAMPLE 6

Figure 12:
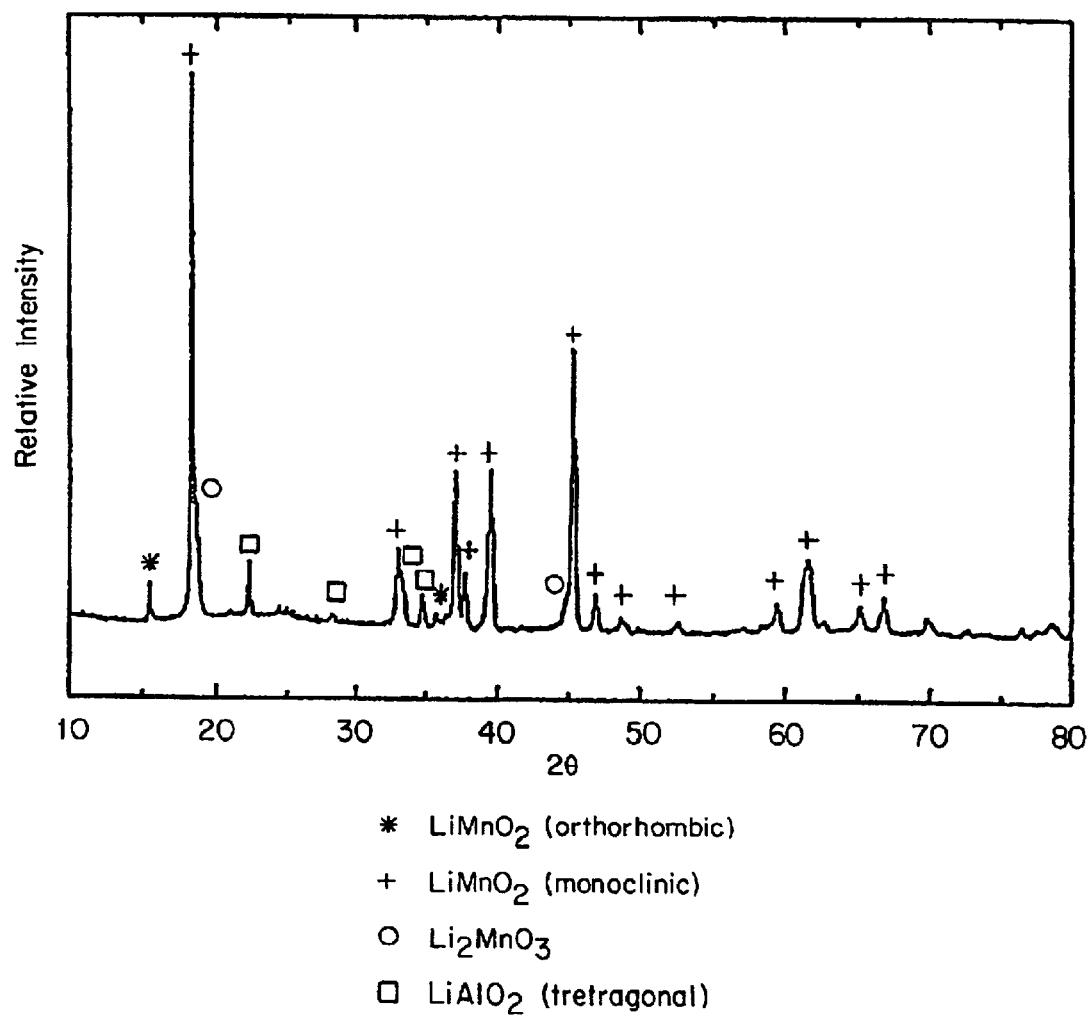
FIG. 12 shows the powder X-ray diffraction pattern for a composition Li(Al$_{0.25}$Mn$_{0.75}$)O$_2$ prepared according to Example 6, and which is crystallized in the monoclinic variant of the α-NaFeO$_2$ structure type.

Synthesis of $LiAl_{0.25}Mn_{0.75}O_2$ by Hydroxide Precipitation and Freeze-Drying, and Firing in a Reducing Gas Atmosphere, and Electrochemical Testing of Same $LiAl_{0.25}Mn_{0.75}O_2$ was prepared by a similar process to Example 4. Aluminum and manganese hydroxide were simultaneously co-precipitated by adding a 0.2 M solution containing $Al(NO_3)_3$ and $Mn(NO_3)_2$ (Alfa Aesar, Ward Hill, Mass.) dissolved in deionized water in a 1:3 molar ratio to a continuously stirred solution of $LiOH.H_2O$ in deionized water kept at pH=10.5. The precipitate was allowed to digest for 12 h, was settled by centrifugation, and the rinsing and settling procedure described in Example 3 was used in order to remove residual nitrate ions. The rinsed precipitate was dispersed a final time in an aqueous solution containing dissolved $LiOH.H_2O$ at a concentration which yielded an overall composition with a Li to Al+Mn ratio of approximately one, and freeze-dried according to the procedure described in Example 4. The freeze-dried precursor was then heated in air and in argon at temperatures of 400–900° C. for 2 h. When the precursor was fired in air, X-ray diffraction showed that the phases formed were $LiMn_2O_4$ spinel and $Li_2MnO_3$. However, when the precursor was fired in argon, X-ray diffraction, FIG. 12, shows that the phase which is formed is the monoclinic variant of $\alpha$-$NaFeO_2$ isomorphous with pure $LiMnO_2$ formed in this structure by the Li ion exchange of $NaMnO_2$ (A. R. Armstrong and P. G. Bruce, *Nature*, Vol.381, p.499, 1996). The monoclinic phase is distinguished from the tetragonal lithiated spinel phase $Li_2Mn_2O_4$ by the appearance of two peaks in the 2 q range 64–68° (F. Capitaine, P. Gravereau, C. Delmas, *Solid State Ionics*, Vol. 89, pp. 197–202, 1996). This result therefore shows that the $\alpha$-$NaFeO_2$ structure type is stabilized by the addition of Al to $LiMnO_2$.

Figure 13:
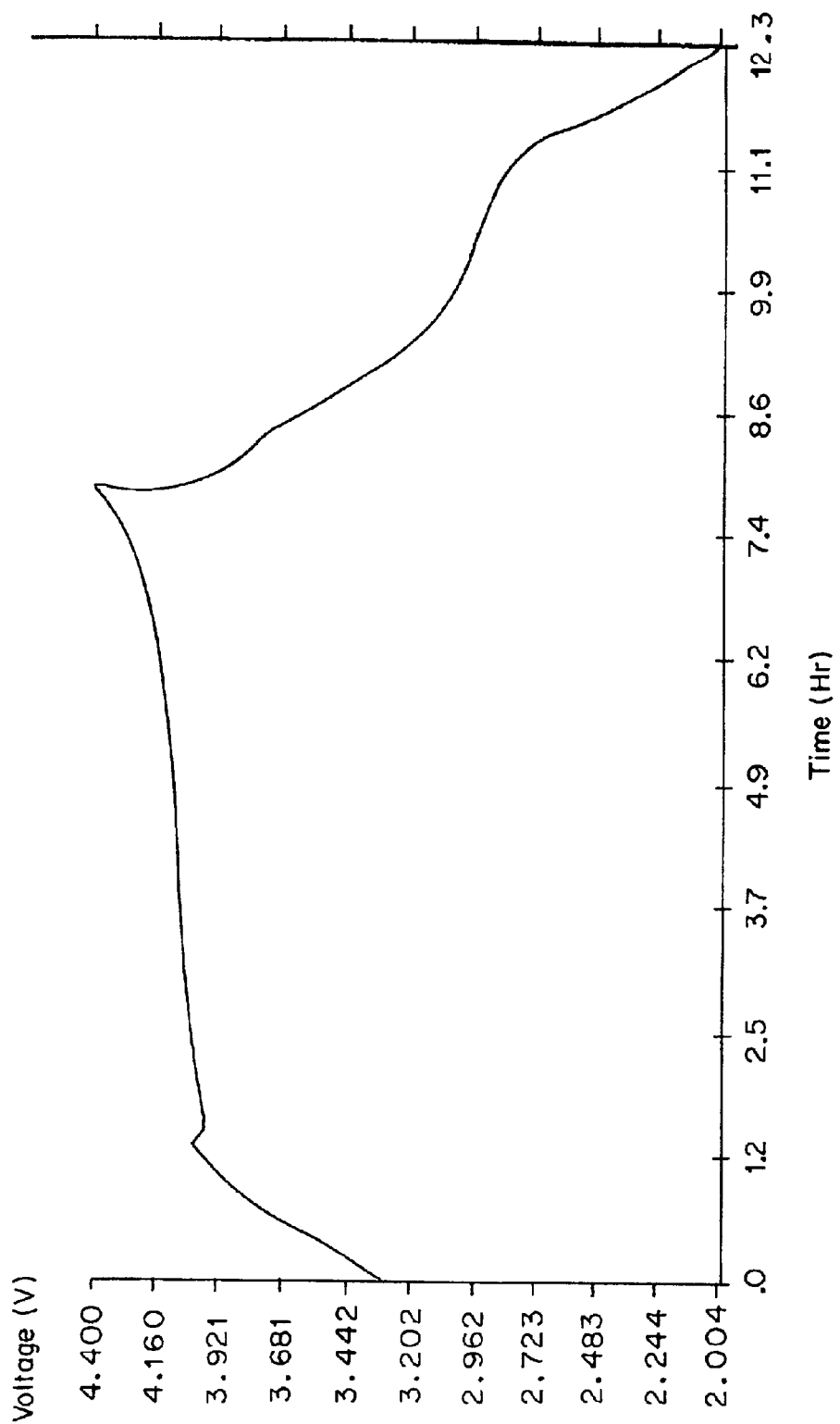
FIG. 13 shows the first charge-discharge curve for a coin cell type Li battery containing Li(Al$_{0.25}$Mn$_{0.75}$)O$_2$ prepared according to Example 6 as the cathode and Li metal as the anode, showing the existence of two voltage plateaus upon discharge indicating a transformation to spinel-like cation ordering in the intercalation compound.

FIG. 13 shows the first charge and discharge cycle for a battery prepared according to Example 5, using said $LiAl_{0.25}Mn_{0.75}O_2$ as the cathode. The charging curve shows a voltage exceeding 4V, which is higher than the voltage realized by Armstrong and Bruce (*Nature*, Vol. 381, p. 499, 1996) for $LiMnO_2$ of this structure prepared by ion exchange. The first discharge curve shows two voltage plateaus, at approximately 4 V and 3 V respectively. The appearance of similar plateaus has been observed in the spinel $LiMn_2O_4$, the higher voltage plateau being associated with intercalation of Li over concentrations between 0<x<1 in $Li_xMn_2O_4$, and the lower voltage plateau being associated with 1<x<2 in $Li_xMn_2O_4$, the higher Li concentration being accomplished typically by using a Li metal anode. The appearance of two voltage plateaus upon discharge has also been reported for orthorhombic $LiMnO_2$ (R. J. Gummow, D.C. Liles, and M. M. Thackeray, *Mat. Res. Bull.*, Vol. 28, pp. 1249–1256, 1993) and for monoclinic $LiMnO_2$ prepared by ion exchange (G. Vitins and K. West, *J. Electrochem. Soc.*, Vol. 144, No. 8, pp. 2587–2592, 1997), and has been attributed to a change in the cation ordering of the respective structures to that of the spinel $LiMn_2O_4$ and lithiated spinel $Li_2Mn_2O_4$.

Figure 14:
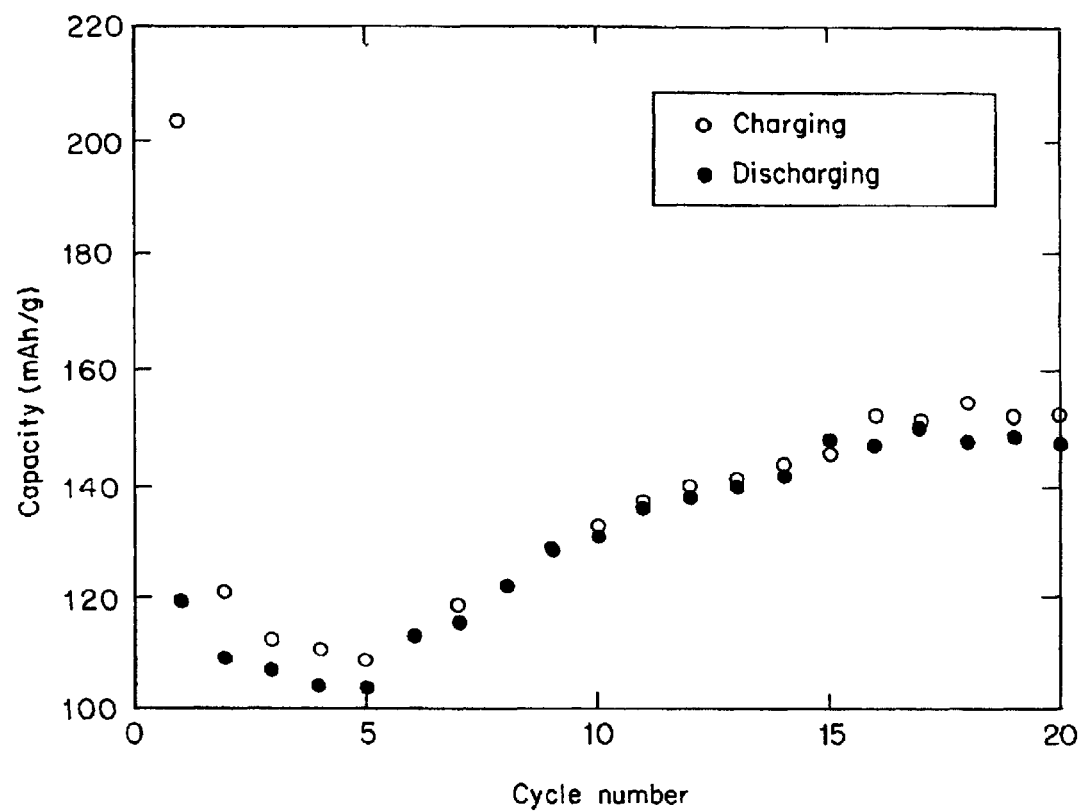
FIG. 14 shows the capacity vs. cycle number for a coin cell type Li battery containing Li(Al$_{0.25}$Mn$_{0.75}$)O$_2$ prepared according to Example 6 as the cathode and Li metal as the anode, showing an initial decrease in capacity followed by an increase and stabilization of the capacity at about 150 mAh/g.

FIG. 14 shows the charge capacity of the battery prepared according to Example 5, using $LiAl_{0.25}Mn_{0.75}O_2$ prepared according to this Example as the cathode, as a function of the cycle number. The battery is cycled over the voltage range 2.0 V to 4.4 V, thereby encompassing both voltage plateaus. It is seen that the charge capacity initially decreases over the first 5 cycles, but then increases again and remains constant at about 150 cycles. This capacity is retained to over 40 cycles. The corresponding energy density is about 290 mAh/g of cathode material.

The cycling stability of this intercalation compound is superior to other Li—Mn—O based compounds. It is well-known in the art that when $LiMn_2O_4$ spinel is cycled over both voltage plateaus, the capacity fades rapidly. This effect has been attributed to a collective Jahn-Teller distortion due to the presence of sufficient $Mn^{3+}$ ions. In addition, both orthorhombic and monoclinic $LiMnO_2$ have been shown to lose capacity rapidly when cycled over both voltage plateaus (I. Koetschau, M. N. Richard, J. R. Dahn, J. B. Soupart, and J. C. Rousche, *J. Electrochem. Soc.*, Vol. 142, No. 9, pp. 2906–2910, 1995, and G. Vitins and K. West, *J. Electrochem. Soc.*, Vol. 144, No. 8, pp. 2587–2592, 1997). The stability of the present intercalation compounds when cycled over both voltage plateaus increases the practical capacity and energy density of the compound compared to other Li—Mn—O compounds which can only be repeatedly cycled over one voltage plateau without incurring significant capacity loss.

The fact that Al additions to a lithium manganese oxide will result in such improvements is unexpected to those skilled in the art. In fact, F. Le Cras et al. (*Solid State Ionics*, Vol. 89, pp. 203–213, 1996) report that a spinel of composition LiAlMnO$_4$ exhibits rapid capacity loss upon cycling over a similar voltage range, thereby teaching away from the present invention. However, the present results do indicate that an intercalation compound of composition LiAl$_y$Mn$_{1-y}$O$_2$ which is prepared in a phase isostructural with orthorhombic LiMnO$_2$ or Li$_2$Mn$_2$O$_4$ spinel will also exhibit good cycling behavior over both voltage plateaus and high energy density.

These results show that by using mixed hydroxide powders as described in Example 2, or by using co-precipitated and freeze-dried powders as in Examples 4 and 6, the predictions of the invention can be realized.

EXAMPLE 7

Preparation of Microphase-Separated, Amorphous, Non-Glassy Nanostructured Block Copolymeric Electrolyte Microphase-separated, amorphous, non-glassy nanostructured block copolymeric electrolyte, in particular a copolymer of lauryl methacrylate with methoxy polyethylene glycol methacrylate (PLMA-b-PMnG) was made by an anionic synthetic route using monofunctional diphenyl methyl potassium as initiator and THF as a solvent. Diphenyl methyl potassium was prepared by first reacting naphthalene and an excess of potassium metal in THF to produce potassium napthalide, then adding a stoichiometric equivalent of diphenyl methane at room temperature. In the copolymerization procedure, an initiator solution was prepared in freshly distilled THF under an inert gas atmosphere, the solution was cooled to −40° C., then the distilled monomers were slowly titrated in. Lauryl methacrylate was injected first, followed 30 minutes later by injection of an equal mass of MnG macromonomer. Each MnG macromonomer contained about 9 ethylene oxide units, below the limit for crystallinity. Upon termination of the reaction with degassed methanol, the copolymer solution was concentrated on a rotary evaporator, precipitated from 10:1 (v/v) hexane:THF, and finally centrifuged to isolate the colorless polymer. The molecular weight of the resulting diblock copolymer was determined by size exclusion chromatography/light scattering to be approximately MW=170,000 Daltons. For comparison purposes, PMnG homopolymer was also anionically synthesized following a similar procedure. Molecular weights and compositional characteristics of the polymers are given in Table III. This system is particularly advantageous due to the high mobility of both blocks at room temperature. The material was structurally characterized by FTIR, NMR and GPC. Additionally, microphase separation was determined in the (PLMA-b-PMnG) system. Simple heating of the sample to above 200° C. using a heat gun failed to induce flow in the sample, providing strong evidence of block segregation.

TABLE III

| | Composition (PLMA:PMnG,v:v) | Molecular weight (g/mol) | Ionic conductivity at 25° C. (10$^{-6}$ S/cm) |
|---|---|---|---|
| PLMA-b-PMnG | 47:53 | 64,700 | 2.54 |
| PLMA-b-PMnG | 32:68 | 77,800 | 4.44 |
| PLMA-b-PMnG | 23:77 | 62,900 | 6.13 |
| PMnG | 0:100 | 100,000 | 9.57 |

Figure 15:
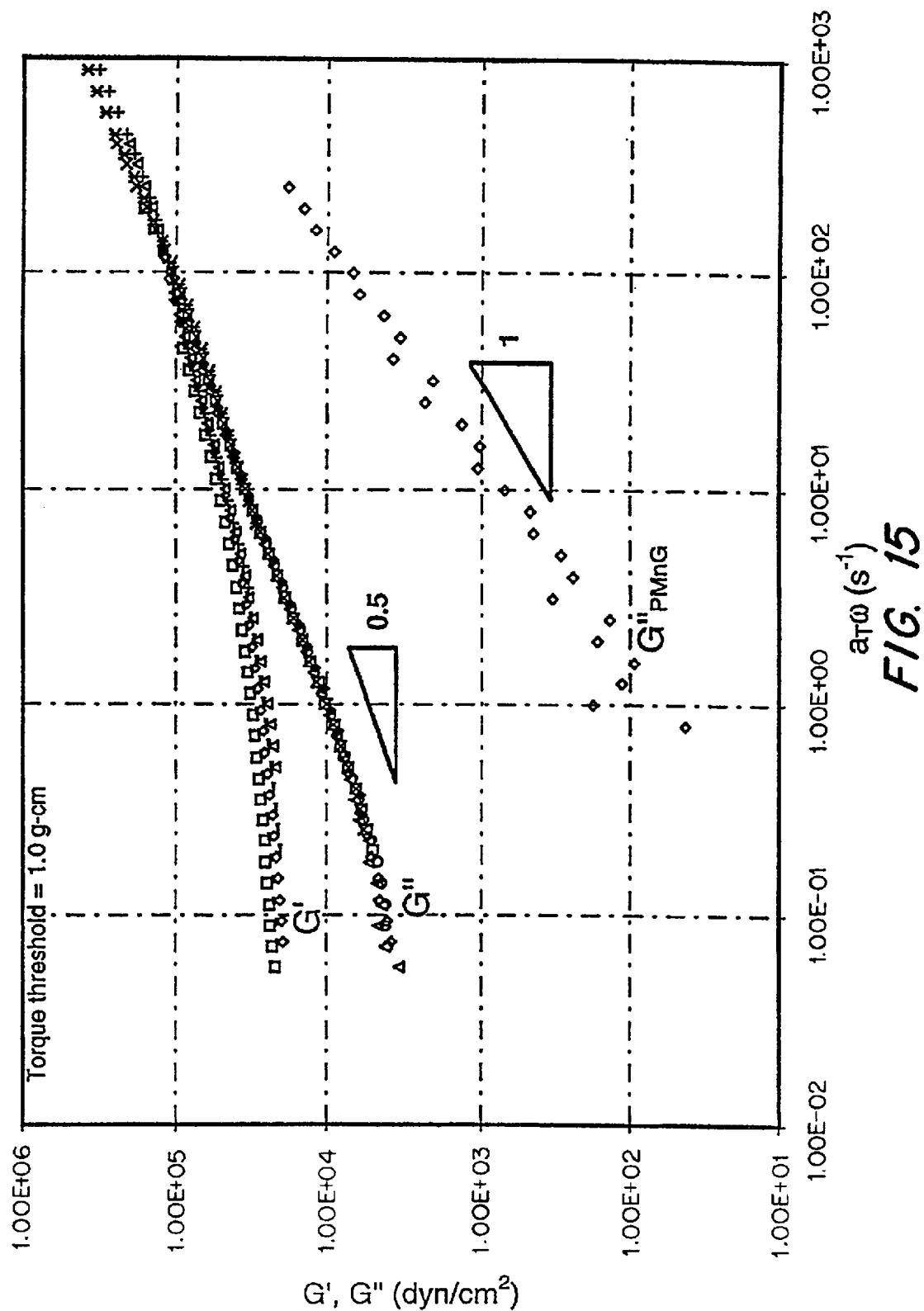
FIG. 15 shows storage (G') and loss (G") moduli for PLMA-b-PMnG (47:53) as a function of reduced frequency, and G" of PMnG homopolymer prepared according to Example 7, in which the reference temperature is 45° C.
Figure 20:
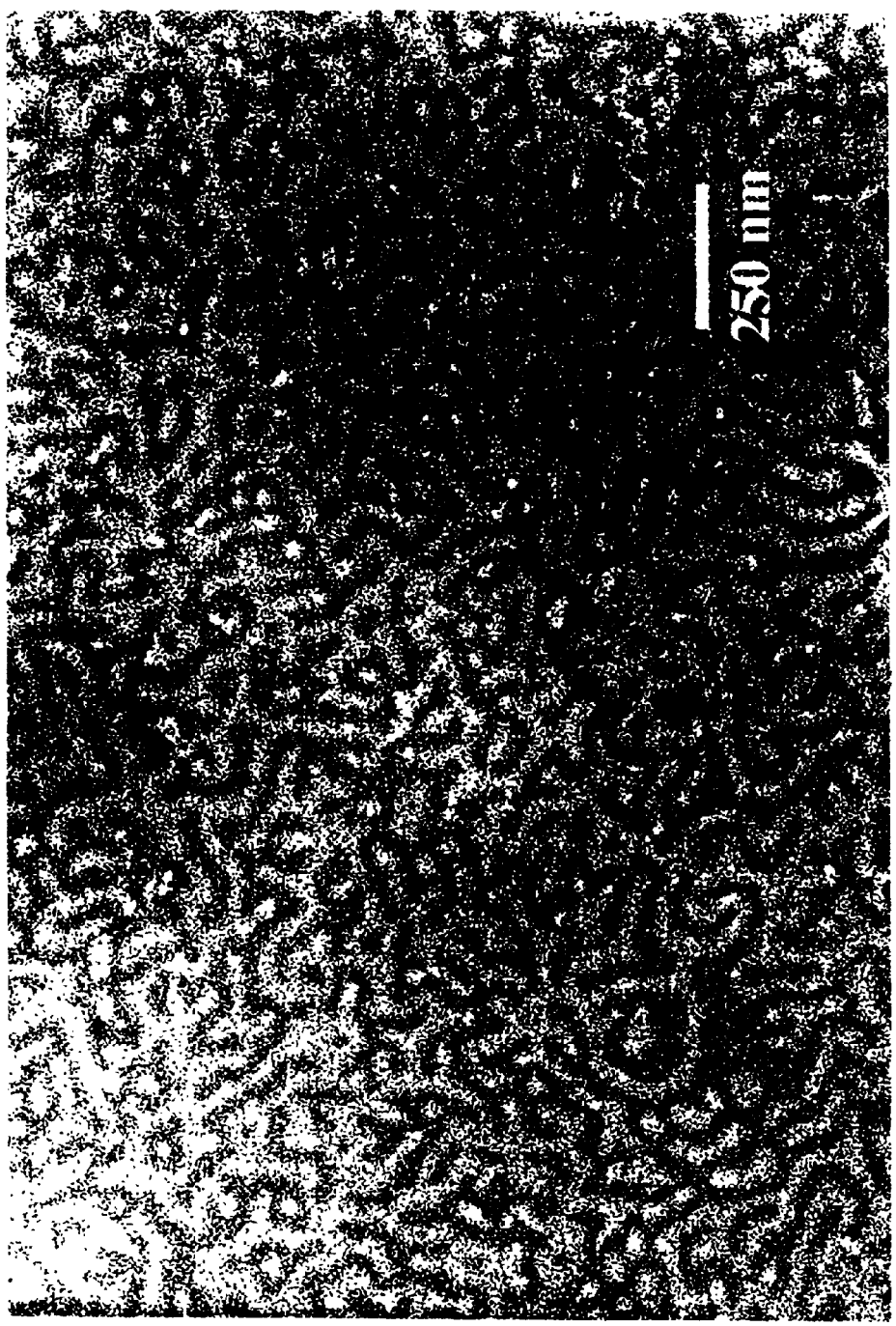
FIG. 20 is a photocopy of a transmission electron micrograph (TEM) of PLMA-b-PMnG (47:53) showing a defect lamellar structure.

Rheological characterization of this system was performed using a Rheometrics ARES rheometer with a parallel plate fixture. The polymer was pressed to a gap width below 1 mm and a stable normal force of approximately 1000 g. The complex shear modulus, G=G'+iG", was then measured as a function of frequency by dynamically shearing the polymer at a fixed strain of 1.5% over the frequency range of 0.1 to 250 rad s$^{-1}$ at temperatures from 25° C. to 90° C. The rheological behavior of block copolymer melts varies dramatically depending on whether the material resides in the ordered or disordered state. FIG. 15 presents typical results for the storage (G') and loss (G") moduli of the PLMA-b-PMnG block copolymers. At low frequencies the storage modulus reaches a plateau value while the loss modulus assumes a limiting power law in which G"~ω$^{0.5}$. This low-frequency scaling behavior is characteristic of a microphase-separated system and verifies its solid-like nature (Karis, Russell, et al., *Macromolecules*, 1995, 28, 1129). Even with the addition of significant amounts (23 wt %) of poly(ethylene glycol) dimethyl ether, PEGDME (Polysciences, M=430 g mol$^{-1}$), the low-frequency scaling behavior observed in FIG. 15 is preserved, indicating that these short PEO chains stay confined to the PMnG domains of the copolymer morphology. The formation of nanoscale domains was further verified by direct imaging with transmission electron microscopy (FIG. 20). By contrast, the PMnG homopolymer exhibits the low frequency scaling behavior G"~ω, indicative of a polymer in its molten state.

The electrolyte was doped with a lithium salt (a variety of salts are known and are suitable). Concentration was EO:Li$^+$=20:1. For all EO:Li$^+$ compositions of the diblock and LiCF$_3$SO$_3$ between 4:1 and 87:1 there was no apparent crystallization as shown by DSC; the polymer flowed only when pressure was applied at temperatures to 110° C.

Conductivity measurements were performed on PEO (Polymer Laboratories, M=448,000 g mol$^{-1}$), the PMnG homopolymer, and the PLMA-b-PMnG block copolymers at fixed salt concentration [EO]:Li$^+$=20:1. Specimens for conductivity measurements were initially dried in a vacuum oven at 70° C. for 24 hours. LiCF$_3$SO$_3$ (lithium triflate) was dried in vacuo at 130° C. for 24 hours. The materials were then transferred into an inert atmosphere, dissolved in dry THF or acetonitrile, and solution cast on a glass die. The polymer/salt complex was then annealed in vacuo for 48 hours at 70° C. Under argon, the polymer electrolyte was loaded between a pair of blocking electrodes made of type 316 stainless steel, pressed to a thickness of about 250 μm, and annealed in situ at 70° C. for 24 hours. On the temperature interval spanning 20° C. to 90° C. electrical conductivity was measured by impedance spectroscopy using a Solartron 1260 Impedance Gain/Phase Analyser.

Figure 16:
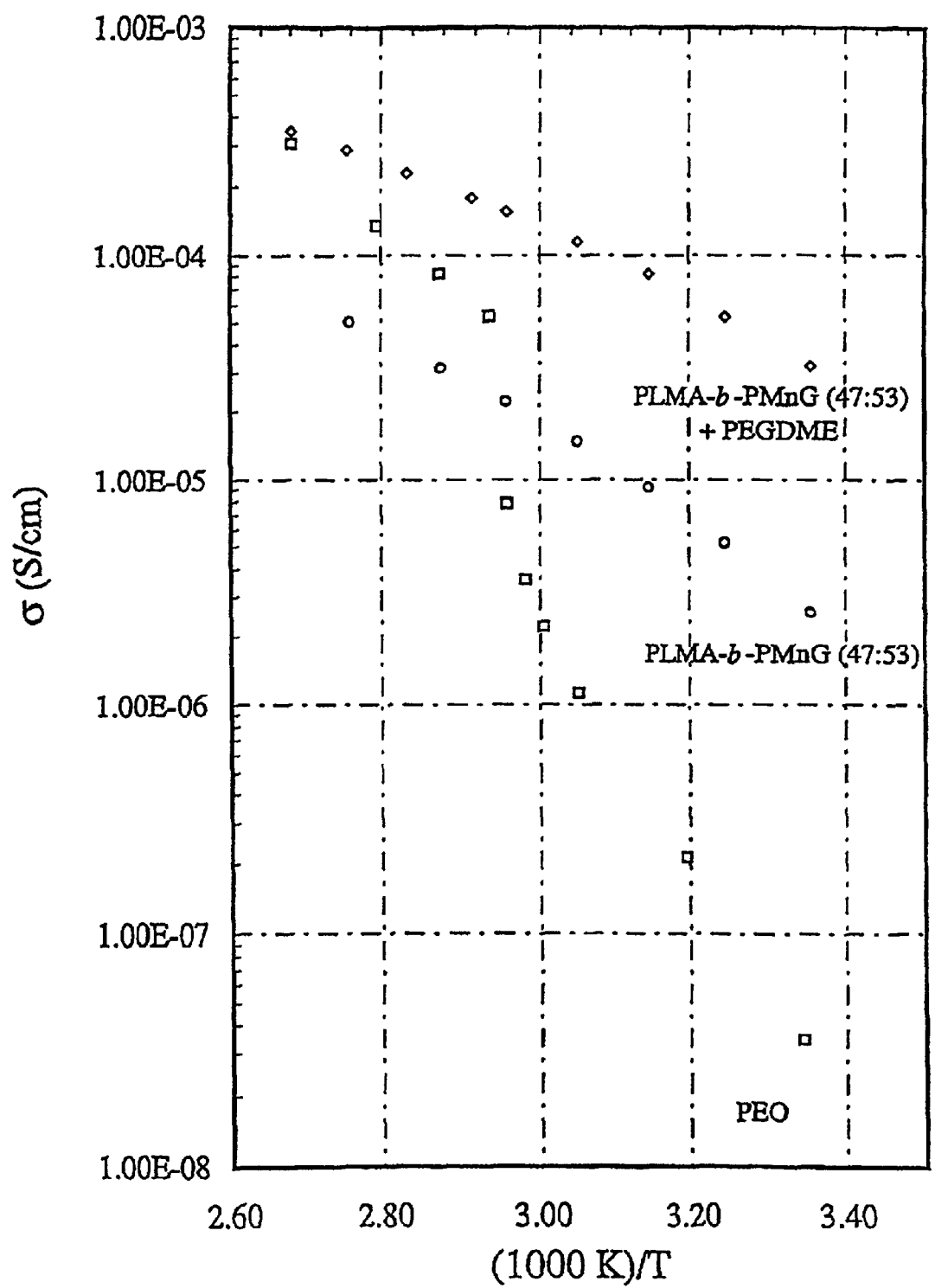
FIG. 16 shows the electrical conductivity of PEO(□) PLMA-b-PMnG (◇) and PLMA-b-PMnG/PEGDME blend (○) systems doped with LiCF$_3$SO$_3$ ([EO]:Li$^+$=20:1) prepared according to Example 7.

FIG. 16 shows that at room temperature the doped 47:53 PLMA-b-PMnG block copolymer displayed ionic conductivities about two orders of magnitude higher than that of doped PEO, and similar to that of pure PMnG. As expected, increasing the PMnG content of the copolymer had the effect of increasing conductivity (Table III). Significantly higher conductivities were achieved by blending the block polymer with PEGDME, resulting in Q values approaching 10$^{-4}$ S cm$^{-1}$ at room temperature.

Cyclic voltammetry was performed on a block copolymer electrolyte (BCE) composed of 87 wt % 47:53 PLMA-b-PMnG and 23 wt % PEGDME at a salt concentration [EO]:Li$^+$=20:1 to investigate the range of electrochemical stability. The BCE was sandwiched between a counter electrode of lithium and a working electrode of aluminum, and pressed to a thickness of approximately 150 μm. A lithium reference electrode was extruded into the cell through the side and positioned near the working electrode.

Potential was scanned from −0.3 to +6.0 V vs. Li/Li+ at a sweep rate of 5 mV s$^{-1}$. Current levels well below 10 μA cm$^{-2}$ were measured between 2.0 and 5.3 V, indicating that the material is electrochemically stable on this voltage interval, which brackets that used in commercial lithium-ion batteries, namely 2.5 to 4.2 V.

Figure 17A:
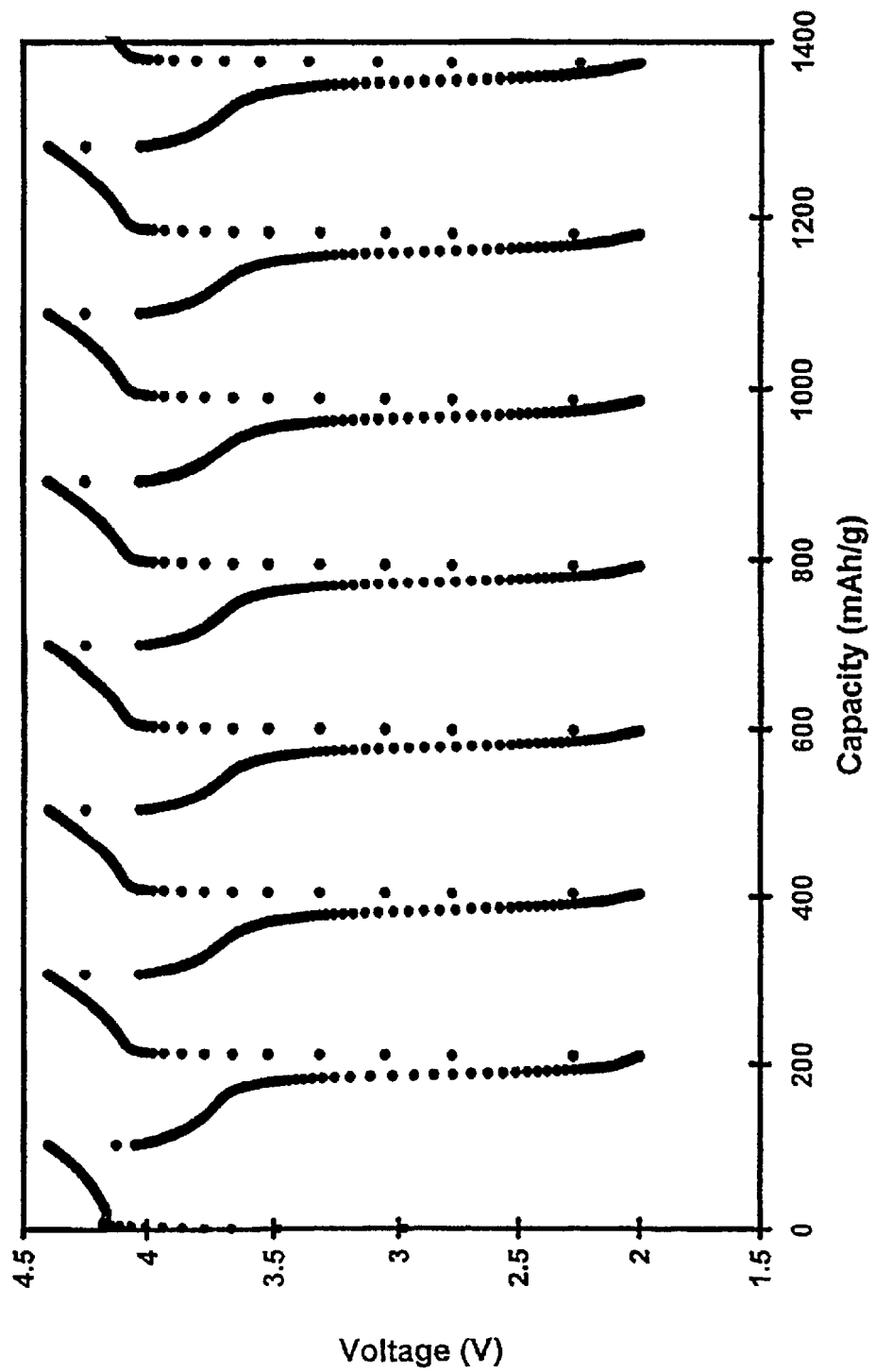
FIG. 17 shows (a) a battery cycle test of Li/BCE/LiCoO$_2$ cell at T=20° C. for the first seven charge/discharge cycles; and (b) first charge/discharge cycle of Li/BCE/LiCoO$_2$ cell at T=−20° C.
Figure 17B:
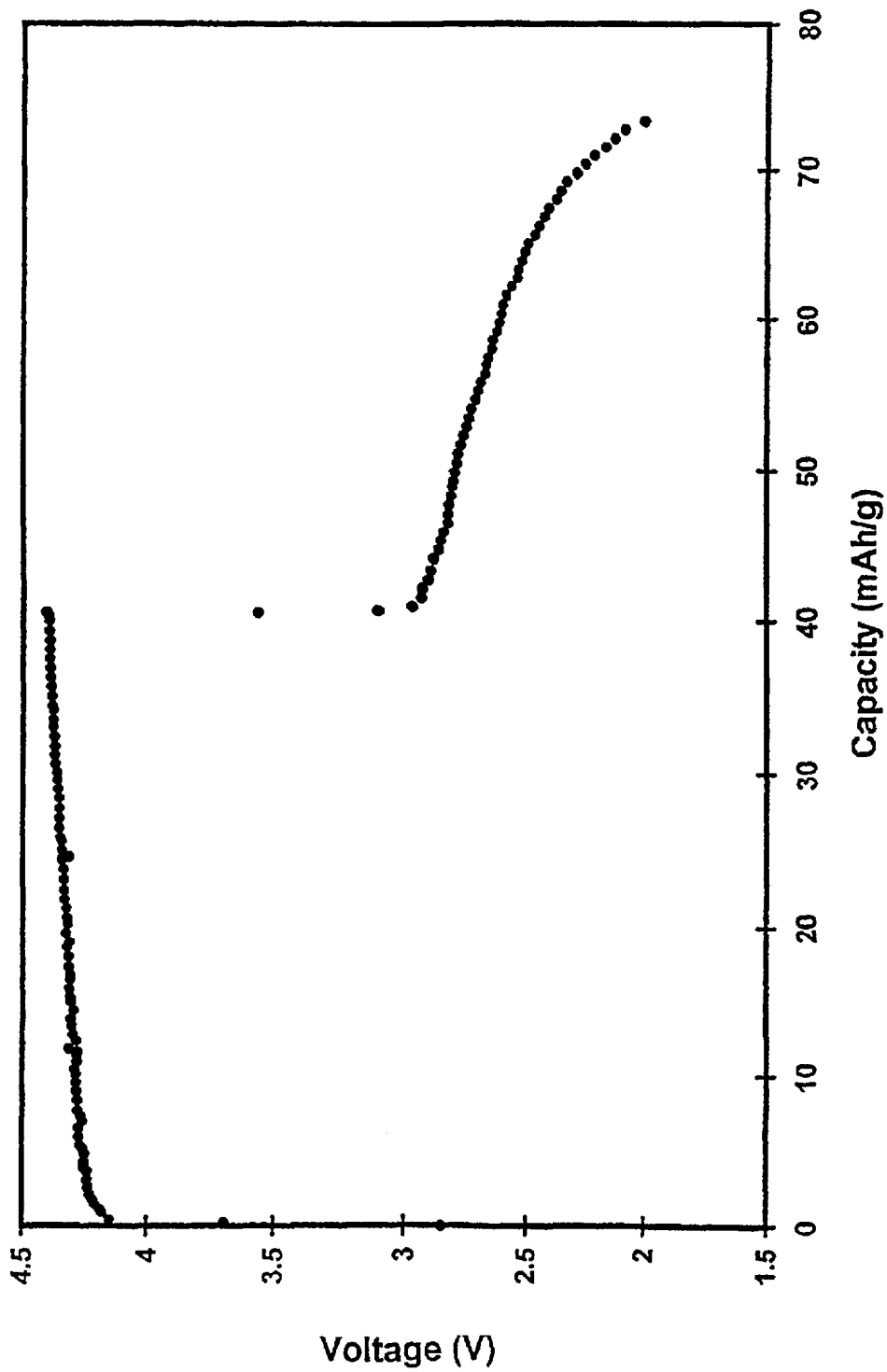

The BCE was subjected to charge/discharge testing in a battery fitted with a lithium-foil anode and a composite cathode of LiCoO$_2$ (57 wt %), carbon black (7 wt %), graphite (6 wt %), and polyacrylonitrile (9 wt %), plasticized with butyrolactone and ethylene carbonate doped with LiClO$_4$ (21 wt %). Electrolyte films were prepared in a dry box by casting the doped block copolymer directly onto lithium foil from 15 wt % dry THF solution. The resulting copolymer films were placed under vacuum at room temperature overnight to remove excess solvent, and pressed to a thickness of approximately 150 μm. Cycle testing was conducted between 2.0 and 4.4 V with a MACCOR Series 4000 Automated Test System over the temperature range from +20 to −20° C. As shown in FIG. 17(a), at room temperature the battery exhibits excellent reversibility and a reversible capacity of about 100 mAh g$^{-1}$. At −20° C. the battery remains fully functional, i.e., it can be discharged and charged, although the capacity is reduced from that measured at room temperature, as shown in FIG. 17(b).

Attempts to take data at lower temperatures (below −20° C.) were frustrated by suspected cathode failure. To further assess the electrical performance of the BCE, a second test cell was constructed in which both electrodes were made of lithium. The Li/BCE/Li cell was subjected to d.c. polarization at an applied potential of 50 mV, and the current response was measured. Isothermal experiments were conducted at 10° intervals from +20° C. to −50° C. While the BCE conductivity decreased with temperature, the material demonstrated its ability to pass current down to −40° C. At a room temperature between −40° C. and −46° C., the PLMA block of the copolymer undergoes its glass transition with the apparent result that the lithium ion mobility drops precipitously. This experiment also allowed us to determine the transference number of Li+ from the ratio of the steady-state current to the initial current. At room temperature $t_{Li+} \approx 0.5$.

EXAMPLE 8

Figure 18:
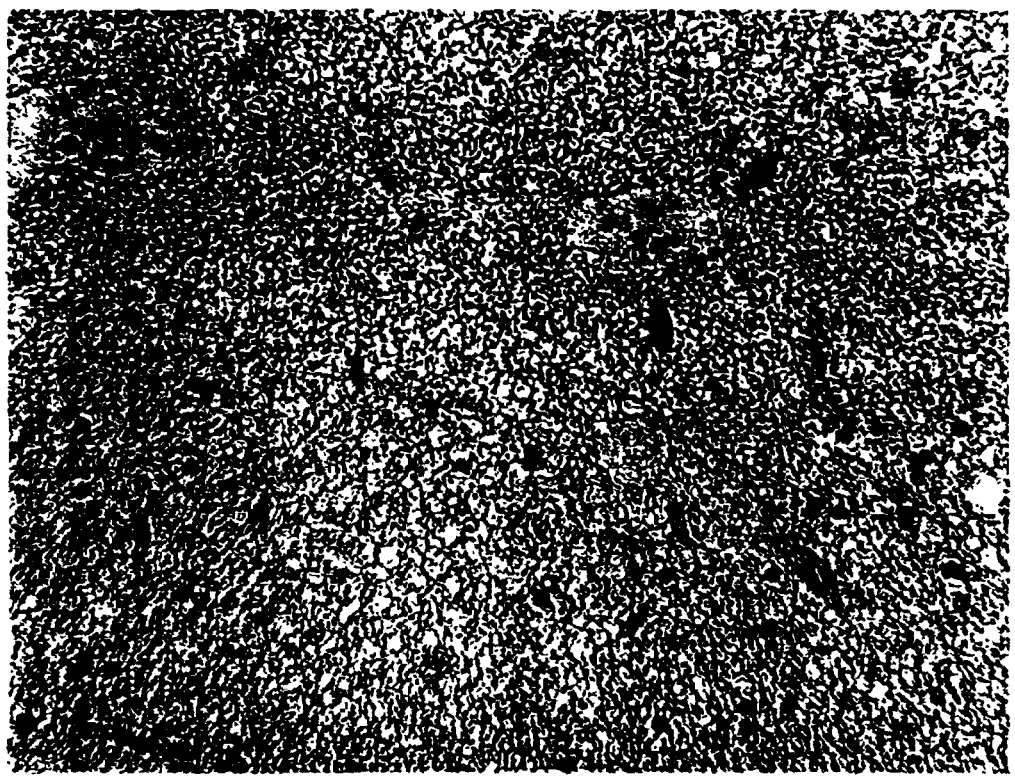
FIG. 18 is a photocopy of an optical micrograph, at magnification 640x, of a phase-separated interpenetrating microstructure of ionically-conductive block copolymeric poly(lauryl methacrylate)-b-PMnG and electronically-conductive poly(p-phenylene-vinylene)

Preparation of a Bicontinuous, Interpenetrating Microstructure of an Electronically-Conductive Polymer and an Ionically-Conductive Polymer An electronically-conductive polymer, poly(p-phenylene-vinylene) (PPV) was prepared following a precursor route (P. L. Burn, et al. *J. Chem. Soc. Perkin. Trans.*, 1, 1992, 3225). The intermediate non-conjugated polymer has good stability and processing properties and can be readily converted into the conjugated PPV by a simple heat treatment. The polymer precursor was blended with an ionically conductive diblock copolymer of example 7 and samples of bicontinuous, interpenetrating microstructures of the electronically-conductive polymer and ionically-conductive polymer were prepared by solvent casting or spin coating this mixture onto glass slides and heating the resulting film under vacuum at 210 C. Optical microscopy showed phase separation of the two polymers into the bicontinuous, interpenetrating microstructure. A photocopy of an optical micrograph of the phase-separated structure is shown in FIG. 18, at magnification 640×.

EXAMPLE 9

Preparation of Bicontinuous, Interpenetrating Microstructures of Electronically-Conductive Polymers and Ionically-Conductive Polymers Sulfonated polyaniline was synthesized according to a reported method (J. Yue, et al., *J. Am. Chem. Soc.*, 112, 2800 (1990)). A random copolymer of methylmethacrylate (MMA) and MnG was synthesized anionically in a manner similar to the method of example 7, but with simultaneous addition of both monomers to form a random copolymer architecture. Mixtures of SPAn and P(MMA-r-MnG) were cast from solution in methanol or m-cresol. The resulting interpenetrating microstructures were structurally characterized by optical and transmission electron microscopy. The characteristic length of the phase separation can be varied between 0.01 and 10 microns, depending upon the processing conditions (i.e., solvent selected, concentration in solvent, etc.).

EXAMPLE 10

Figure 19:
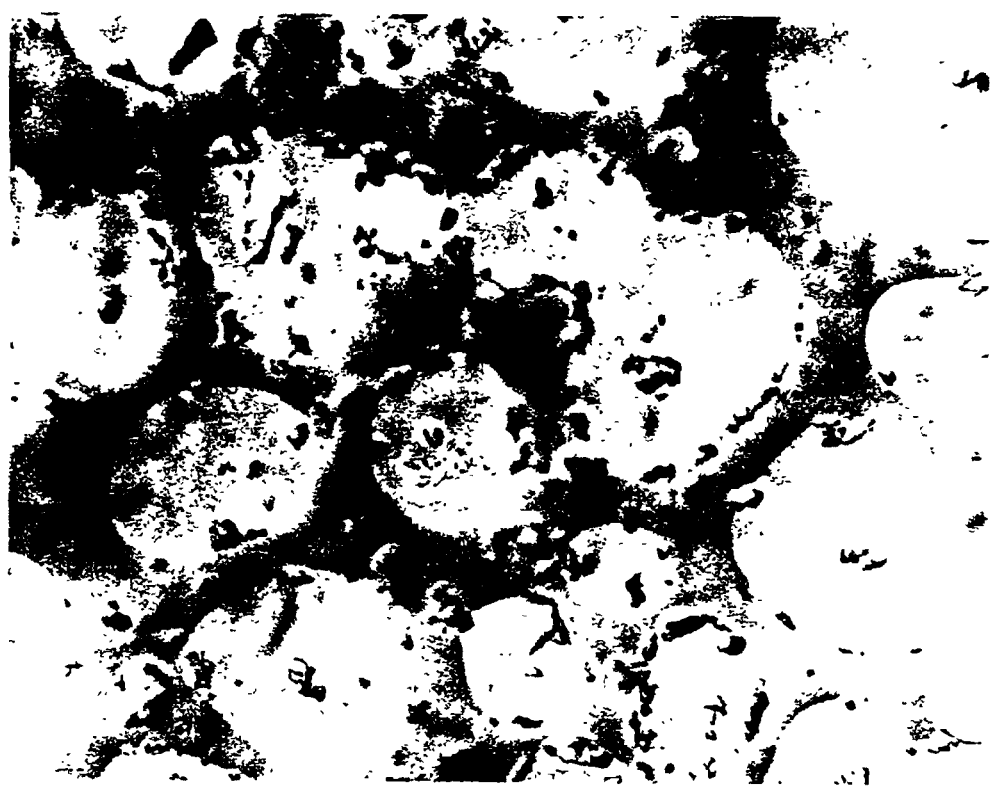
FIG. 19 is a photocopy of an optical micrograph of an interpenetrating phase separated microstructure of sulfonated polyaniline (SPAn; an electrically-conductive polymer), P(MMA-r-MnG) (a random copolymer electrolyte), with fine particles of Al$_2$O$_3$ (≈5 μm in diameter) located at the phase boundary.

Preparation of Bicontinuous, Interpenetrating Microstructures of Electronically-Conductive Polymers and Ionically-Conductive Polymers With Particles Positioned At Interphase Boundaries Sulfonated polyaniline (SPAn; an electrically-conductive polymer), P(MMA-r-MnG) (random copolymer electrolyte), and fine particles of Al$_2$O$_3$ (≈5 μm in diameter) were cast from methanol or m-cresol solution. FIG. 19 is a photocopy of an optical micrograph of a the resulting interpenetrating microstructure. The Al$_2$O$_3$ phase appears as dark particles outlining the interface between the polymer electrolyte-rich regions (light phase) and the SPAn-rich regions (dark phase).

SPAn and P(MMA-r-MnG) and TiO$_2$ particles of about 0.1 micron diameter were cast from a similar solution. Phase separation of the polymers occurred and TiO$_2$ was observed by TEM to segregate to interphase boundaries.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

Having thus described certain embodiments of the present invention, various alterations, modifications and improvements will be apparent to those skilled in the art. Such alterations, modifications and improvements are intended to be part of this disclosure and are intended to be within the scope of the present invention. Accordingly, the foregoing description is by way of example only and not intended as limiting. The present invention is limited only as defined by the following claims and equivalents thereto.

What is claimed is:

1. A polymer electrolyte comprising:
  a non-crosslinked association of a plurality of block copolymer chains each including at least one ionically-conductive block and at least one second block immiscible with the ionically-conductive block;
  the association amorphous and non-glassy through the entire range of at least from about 0° C. to about 70° C.; and
  the chains arranged in an ordered nanostructure including a continuous matrix of amorphous domains defined by association of ionically-conductive blocks providing continuous ionically-conductive pathways, and amorphous second domains, immiscible with the ionically-conductive domains, defined by association of second blocks.

2. A polymer electrolyte as in claim 1, wherein the ordered nanostructure is formed upon reduction of temperature of a disordered melt.

3. A polymer electrolyte as in claim 1, wherein the ordered nanostructure is formed from a solution upon evaporation.

4. A polymer electrolyte as in claim 1, wherein the ordered nanostructure is formed from a solution upon precipitation.

5. A polymer electrolyte as in claim 1, wherein the ionically-conductive blocks form continuous, ionically-conducting domains when doped with an appropriate salt.

6. A polymer electrolyte as in claim 1, wherein the electrolyte is free of crosslinking, crystallization or glassification and the ordered nanostructure exhibits global dimensional stability and chain mobility providing high ionic conductivity.

7. A polymer electrolyte as in claim 6, wherein interblock, non-covalent chemical attractions create associations between the chains that allows for chain mobility providing high ionic conductivity while maintaining dimensional stability.

8. A polymer electrolyte as in claim 1, wherein the molecular weight of the block copolymer chains of the ionically-conductive polymer is at least about 10,000 Daltons.

9. A polymer electrolyte as in claim 8, wherein the molecular weight of the block copolymer chains of the ionically-conductive polymer is at least about 25,000 Daltons.

10. A polymer electrolyte as in claim 9, wherein the molecular weight of the block copolymer chains of the ionically-conductive polymer is at least about 50,000 Daltons.

11. A polymer electrolyte as in claim 10, wherein the molecular weight of the block copolymer chains of the ionically-conductive polymer is at least about 100,000 Daltons.

12. A polymer electrolyte as in claim 1, wherein the second block is ionically-conductive.

13. A polymer electrolyte as in claim 1, the second block including non-ionically-conductive acrylates selected from the group consisting of polydecyl methacrylate, polylauryl methacrylate, wherein decyl and lauryl can be replaced with moieties having a number of carbon atoms high enough that the glass transition temperature of the block is less than service temperature, and selected such that crystallization does not occur, polyalkyl acrylates, polydimethyl siloxane, polybutadiene, polyisoprene, and saturated polymers or copolymers derived from polybutadiene and polyisoprene such as polyethylethylene and polyethylenepropylene and copolymers thereof, and modified polystyrenes with flexible side chains of alkyl fluorocarbon and siloxane side chains attached through the phenyl group.

14. A polymer electrolyte as in claim 1, wherein the association of block copolymer chains is amorphous and non-glassy within a temperature range of at least from about −40° C. to about 70° C.

15. A polymer electrolyte as in claim 1, wherein the second block has a Tg of less than about 0° C.

16. A polymer electrolyte as in claim 15, wherein the second block has a Tg of less than about −25° C.

17. A polymer electrolyte as in claim 16, wherein the second block has a Tg of less than about −40° C.

18. A polymer electrolyte as in claim 1, wherein the second block is electronically-non-conductive.

19. A polymer electrolyte as in claim 1, wherein the ionically conductive block is selected from the group consisting of methoxy polyethylene glycol methacrylate, methoxy polyethylene glycol acrylate, and other acrylate and methacrylate polymers modified to include short polyethylene oxide and polyethylene glycol side chains, polybutadiene or polyisoprene modified so as to include polyethylene oxide or polyethylene glycol side chains of length less than about 20 oxide units, polystyrene similarly modified through the phenyl group to include polyethylene oxide or polyethylene glycol side groups.

20. A polymer electrolyte as in claim 1, wherein the ionically-conductive domain incorporates an auxiliary ionic conductor.

21. A polymer electrolyte as in claim 20, wherein the auxiliary ionic conductor is polyethylene glycol dimethyl ether.

22. A polymer electrolyte as in claim 1, wherein the domains defined by association of ionically-conductive blocks define continuous ionic pathways due either to defects in the association, or inherent micro-phase separation.

23. A polymer electrolyte as in claim 1, doped with a lithium salt.

24. A polymer electrolyte as in claim 1, constructed and arranged as an electrolyte in a battery.

25. A polymer electrolyte as in claim 24, constructed and arranged as an electrolyte in an ionic solid state battery.

26. A polymer electrolyte as in claim 24, constructed and arranged as an electrolyte in a lithium solid battery.

27. A polymer electrolyte as in claim 1, wherein the block copolymer is a diblock copolymer.

28. A polymer electrolyte as in claim 1, wherein the block copolymer is a triblock copolymer.

* * * * *

UNITED STATES PATENT AND TRADEMARK OFFICE
CERTIFICATE OF CORRECTION

PATENT NO. : 7,026,071 B2
APPLICATION NO. : 09/862916
DATED : April 11, 2006
INVENTOR(S) : Anne M. Mayes et al.

Page 1 of 1

It is certified that error appears in the above-identified patent and that said Letters Patent is hereby corrected as shown below:

IN THE TITLE::

"A NON-CROSSLINKED, AMORPHOUS, BLOCK COPOLYMER ELECTROLYTE FOR BATTERIES"

TO:

--POLYMER ELECTROLYTE, INTERCALATION COMPOUNDS AND ELECTRODES FOR BATTERIES--

Please change the Inventors from:

"Anne M. Mayes, Gerbrand Ceder, Yet-Ming Chiang, Donald R. Sadoway, Mehmet K. Aydinol, Philip P. Soo, Young-Il Jang, Biying Huang"

to the following:

--Anne M. Mayes, Donald R. Sadoway, Philip P. Soo, and Biying Huang--

Signed and Sealed this

Twenty-fifth Day of July, 2006

JON W. DUDAS
*Director of the United States Patent and Trademark Office*